(12) United States Patent
Hiraguchi

(10) Patent No.: US 6,988,685 B2
(45) Date of Patent: Jan. 24, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 18 days.

(21) Appl. No.: 10/910,352

(22) Filed: Aug. 4, 2004

(65) Prior Publication Data

US 2005/0040270 A1    Feb. 24, 2005

(30) Foreign Application Priority Data

Aug. 22, 2003   (JP)  ............................. 2003-299048

(51) Int. Cl.
*G11B 23/107*   (2006.01)
(52) U.S. Cl. .................. 242/332.4; 242/348.2
(58) Field of Classification Search ............ 242/332.4, 242/348, 348.2, 532, 532.1; 360/132
See application file for complete search history.

(56) References Cited

U.S. PATENT DOCUMENTS

| | | | |
|---|---|---|---|
| 4,977,474 A * | 12/1990 | Oishi et al. ............... | 242/348.2 |
| 5,232,180 A | 8/1993 | Hoge et al. | |
| 5,465,187 A * | 11/1995 | Hoge et al. ................. | 360/132 |
| 5,868,333 A * | 2/1999 | Nayak ..................... | 242/348.2 |
| 6,349,892 B2 * | 2/2002 | Morita et al. ............... | 360/132 |
| 6,739,539 B2 * | 5/2004 | Hiraguchi et al. ........ | 242/348.2 |
| 6,889,929 B2 * | 5/2005 | Ishihara ................... | 242/348.2 |
| 6,908,056 B2 * | 6/2005 | Hiraguchi ................. | 242/348 |

* cited by examiner

*Primary Examiner*—William A. Rivera
(74) *Attorney, Agent, or Firm*—Sughrue Mion, PLLC

(57) ABSTRACT

A recording tape cartridge which is not subject to concern about a leader block disengaging, even when a case is subjected to an impact due to dropping or the like. The recording tape cartridge is provided with the case, an aperture for drawing out a recording tape, and a leader block. The case rotatably accommodates a single reel, on which the recording tape is wound. The aperture is formed in a peripheral wall of the case. The leader block is fixed to an end portion of the recording tape, is drawn out by drawing-out means of a drive device, and is capable of closing the aperture. At this recording tape cartridge, a cover member, which covers at least a portion of the leader block that is closing the aperture, is provided to be slideable along the peripheral wall.

15 Claims, 19 Drawing Sheets

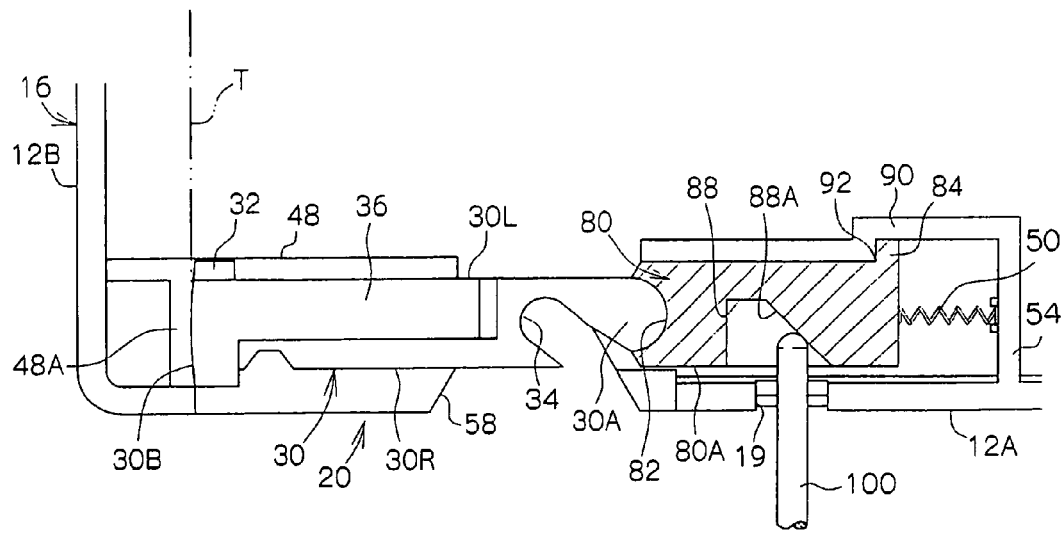
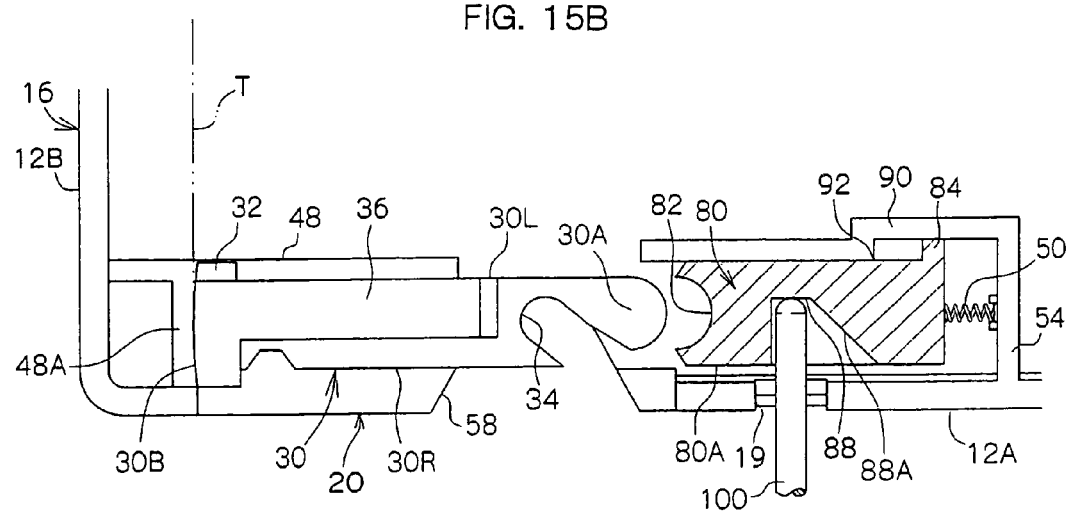

RECORDING TAPE CARTRIDGE

CROSS-REFERENCE TO RELATED APPLICATION

This application claims priority under 35USC 119 from Japanese Patent Application No. 2003-299048, the disclosure of which is incorporated by reference herein.

BACKGROUND OF THE INVENTION

1. Field of the Invention

The present invention relates to a recording tape cartridge.

2. Description of the Related Art

A recording tape cartridge (magnetic tape cartridge) at which a magnetic tape, which is used as a data recording/replaying medium for a computer or the like, is wound onto a single reel and this reel is accommodated in a case made of synthetic resin has been known hitherto. At a distal end (free end) of a magnetic tape thereof, a leader member, such as a leader pin, a leader tape, a leader block or the like is fixed. Drawing-out means, which is provided at a drive device, draws the leader member out through an opening aperture of the recording tape cartridge and winds the magnetic tape, which is fixed to the leader member, onto a winding reel of the drive device.

A circular opening is formed through a lower face of the recording tape cartridge, and a reel gear is provided in an annular form at a center of the lower face of the reel and exposed through this opening. A drive gear, which is provided at a rotation shaft of the drive device, meshes with the reel gear. With this structure, the reel is driven to rotate. When the reel of the recording tape cartridge and the winding reel of the drive device are rotated at the same time, data can be recorded to the magnetic tape and/or data that has been recorded to the magnetic tape can be replayed.

At a recording tape cartridge with such a structure, the leader member is a coupling member which is coupled with the drive device side winding reel in a state in which the magnetic tape is pulled tight. However, types of the opening aperture formed in the case, a door which opens and closes the opening aperture and so forth differ for the different types of leader member. For example, in a case with a leader block, the opening aperture is formed at a corner portion at a side in a direction of loading of the recording tape cartridge (the case) into a drive device, and the leader block is engaged so as to close off the opening aperture. That is, the leader block is structured so as to also serve as a door for closing the opening aperture.

This leader block is structured by a stiff body. Therefore, in comparison to a tape-form leader tape, an operation of engagement with the drive device side drawing-out means can be performed more easily, which is advantageous in that abrasion and damage to an engaging portion of the drawing-out means is less likely to occur. Furthermore, when the opening aperture is at the corner portion of the case, this is advantageous in that an angle of drawing-out of the leader block can be freely selected in design of the drive device. For example, design is possible so as to draw out the leader block along a shortest distance to the winding reel, and design is possible so as to complete the operation of drawing-out of the magnetic tape in a short time.

However, if a leader block is engaged at a corner portion of a recording tape cartridge (a case) at times of non-use (when the recording tape cartridge is not loaded at a drive device), there is a problem in that if the corner portion is subjected to an impact, due to dropping or the like, it is likely that the case will be warpingly deformed and that the leader block will fall out from the corner portion.

When the leader block is detached and thrown out from the case due to dropping or the like, a user will consequently be subjected to concern as to whether the functionality of the recording tape cartridge has been affected, and will be subjected to concern as to whether or not the recording tape cartridge will operate in the drive device if repaired by hand. Moreover, in practice, creases may be formed in the magnetic tape when the recording tape cartridge is dropped and the leader block detaches from the case. Furthermore, when the leader block improperly detaches, because the leader block itself functions as a door, there is a problem in that dustproofing of the recording tape cartridge is breached.

Accordingly, it has conventionally been thought that impacts due to dropping and the like can be mitigated and effects on the leader block kept to a minimum by, for example, forming the corner portion in a form which is itself easily deformed by warping. However, such structures by themselves have been insufficient as countermeasures for preventing detachment of leader blocks.

Accordingly, as shown in FIGS. 18A and 18B, for example, provision of a flat plate-form engaging member 120 at a vicinity of an opening 114 of a recording tape cartridge 110 has been considered. A pair of support members 116 are provided standing apart by a predetermined spacing at an inner face of a case 112 at the vicinity of the opening 114. A shaft portion 122, which is formed at one end of the engaging member 120, is rotatably supported at the pair of support members 116. A protrusion 124, which is formed at the other end of the engaging member 120, engages with an engaging groove 128. The engaging groove 128 is formed at a fixing portion 130B side of a leader block 130, at which side the magnetic tape is attached. (See, for example, the specification of U.S. Pat. No. 5,232,180.)

At a time of non-use of the recording tape cartridge 110, as shown in FIG. 18A, the protrusion 124 engages with the engaging groove 128 of the leader block 130, and detachment of the leader block 130 from the case 112 is prevented. Then, at a time of use of the recording tape cartridge 110, as shown in FIG. 18B, a release member 126 enters through an aperture 118, which is formed through the case 112, and the aforementioned other end of the engaging member 120, including the protrusion 124, is pushed up by the release member 126. The engaging member 120 rotates upward about the shaft portion 122, as a result of which the protrusion 124 is removed from the engaging groove 128. Consequently, the leader block 130 can be taken out from the case 112.

However, because this engaging member 120 is a structure in which the shaft portion 122 is supported at the pair of support members 116 which are provided standing apart by the predetermined spacing at the inner face of the case 112 and the engaging member 120 rotates upward about the shaft portion 122 to be removed from the engaging groove 128, there is a problem in that it is necessary to provide a large amount of space for disposition thereof in the vicinity of the opening 114. That is, as shown in FIG. 19A, because the pair of support members 116 are provided standing apart by the predetermined spacing, space is required in a lateral direction of the case 112 (a direction intersecting a height direction of the case 112), and as shown in FIG. 19B, because the release stroke is higher than a height of the leader block 130, space is required in the height direction of the case 112. Thus, the large amount of space for disposition is required in the vicinity of the opening 114, and the recording tape cartridge 110 is larger, which is a problem.

SUMMARY OF THE INVENTION

Accordingly, an object of the present invention is to provide a recording tape cartridge which is not subject to concern about detachment of a leader block when a case thereof is subjected to an impact due to dropping or the like, without a disadvantage such as enlargement.

In order to achieve the object described above, according to one aspect of the present invention, a tape cartridge is provided which is insertable at a tape drive, the tape drive including an opening member which is operably engageable with the tape cartridge at a time of insertion of the tape cartridge and carrying out at least one of reading and writing of data, and the tape cartridge including: a case which accommodates a tape; a tape access opening formed in the case; a leader block attached to an end of the tape; an accommodation portion for accommodating the leader block; and an engaging member which is slideable between a restraining position, at which the engaging member engages with the leader block for restraining the leader block at the accommodation portion, and a non-restraining position, at which the engaging member does not engage with the leader block.

According to another aspect of the present invention, a tape drive is provided for carrying out at least one of reading and writing of data at a tape cartridge which is insertable at the tape drive, the tape cartridge including: a case which accommodates a tape; a tape access opening formed in the case; a leader block attached to an end of the tape; an accommodation portion for accommodating the leader block; and an engaging member which is slideable between a restraining position, at which the engaging member engages with the leader block for restraining the leader block at the accommodation portion, and a non-restraining position, at which the engaging member does not engage with the leader block, and the tape drive including an opening member which is capable of operably engaging with the tape cartridge at a time of insertion of the tape cartridge.

Other objects, features and advantages of the present invention will be apparent to those skilled in the art from the explanation of the preferred embodiments of the present invention illustrated in the appended drawings, and from the appended claims.

BRIEF DESCRIPTION OF THE DRAWINGS

FIGS. 15A and 15B are views for explaining operation of the other abutting member of the third embodiment.

DETAILED DESCRIPTION OF THE INVENTION

Figure 1:
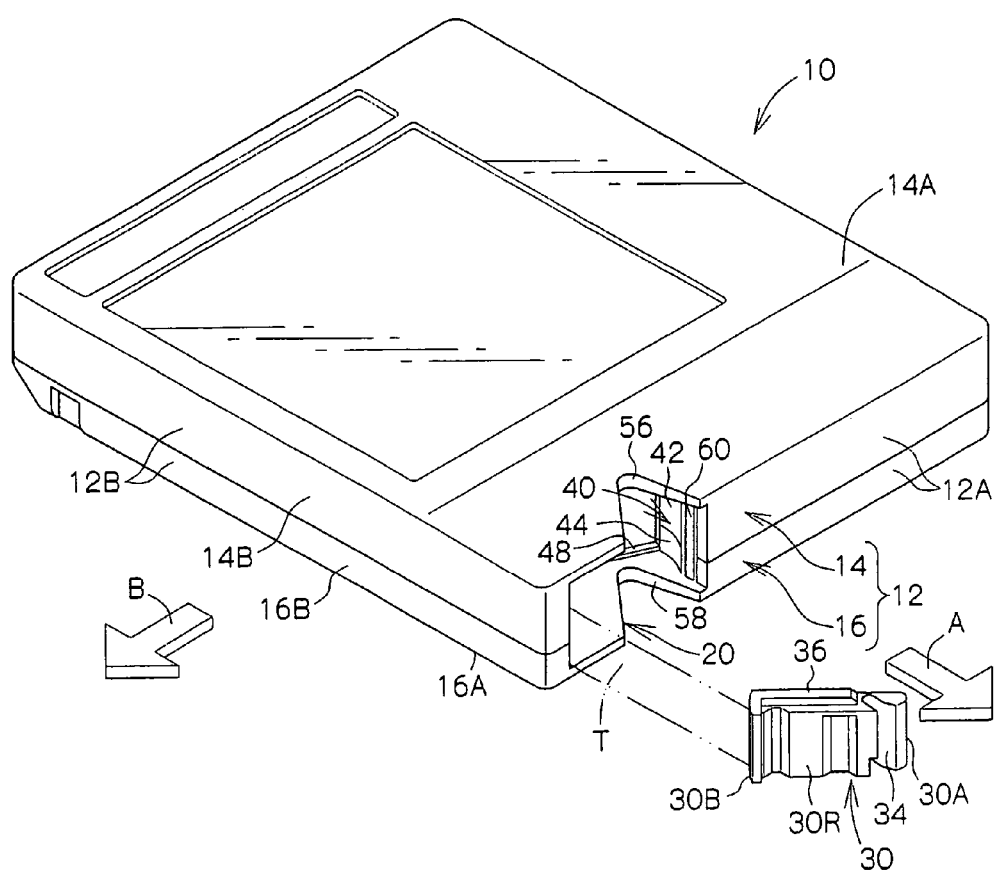
FIG. 1 is a schematic perspective view of a recording tape cartridge, seen from above.

Herebelow, embodiments of the present invention will be described on the basis of the embodiments shown in the drawings. For convenience of explanation, a loading direction of a recording tape cartridge 10 into a drive device is shown as arrow A, and is regarded as a forward direction (front side) of the recording tape cartridge 10. The direction of arrow B, which intersects arrow A, is regarded as a rightward direction (right side).

First Embodiment

Figure 2:
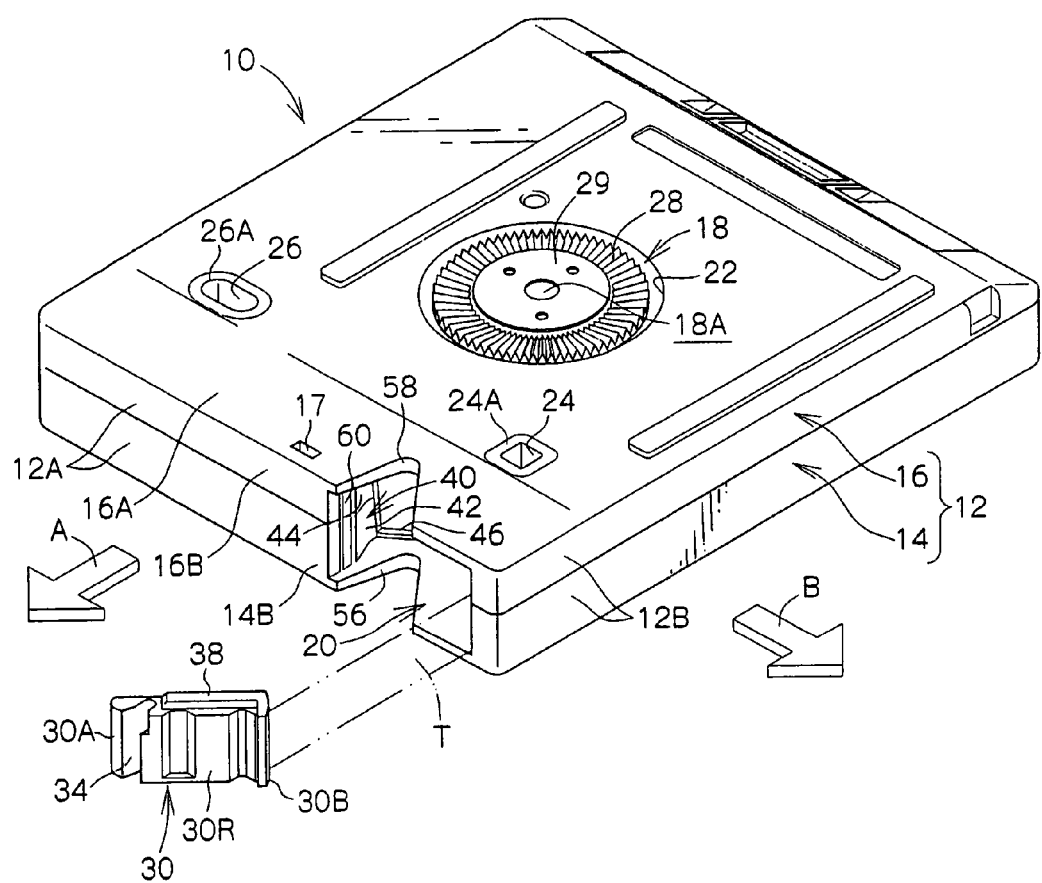
FIG. 2 is a schematic perspective view of a recording tape cartridge, seen from below.

Firstly, a first embodiment will be described. As shown in FIGS. 1 and 2, the recording tape cartridge 10 is provided with a case 12. The case 12 is structured by joining together an upper case 14 and a lower case 16. More specifically, the upper case 14 is structured with a substantially frame-like peripheral wall 14B provided standing along outer edges of a ceiling plate 14A which is substantially rectangular in plan view, and the lower case 16 is structured with a peripheral wall 16B provided standing along outer edges of a floor plate 16A which substantially corresponds with the ceiling plate 14A.

Thus, the case 12 is formed in a substantial box form by, in a state in which the opening end of the peripheral wall 14B and the opening end of the peripheral wall 16B are matched up, joining the upper case 14 with the lower case 16 by fixing with screws. Here, it is preferable if screw bosses 15 are provided at least at each of corner portions (see FIGS. 5 to 7B). With such a structure, secure joining at each corner portion is possible. Note that means for fixing the upper case 14 with the lower case 16 is not limited to screw-fixing, and joining by ultrasonic welding or the like is also possible.

An aperture 20 is formed in the case 12 for drawing out a magnetic tape T, which is wound on a later-described reel 18, to outside the case 12. The aperture 20 is formed at a predetermined position of a peripheral wall 12A (below referred to as front wall 12A) which is at the side of the direction of loading of the case 12 into a drive device. Specifically, the aperture 20 is formed at a position which is spaced from a right corner portion toward a left corner portion of the front wall 12A by at least a plate thickness of the case 12. Thus, because the aperture 20 is formed in the peripheral wall (front wall 12A) but not at the corner portion, a leader block 30, which is described later, will be disposed at a position which is separated from the corner portion. Therefore, the leader block 30 will be less likely to detach from the case 12 if the recording tape cartridge 10 is dropped on the corner portion.

A circular gear aperture 22 which passes through the floor plate 16A is formed at a substantially central portion of the floor plate 16A, for exposure of a reel gear 28 which is formed at the reel 18. At a portion of the floor plate 16A at an edge of the gear aperture 22, an annular rib (not shown) is provided protruding toward the inside of the case 12. Thus, at times of non-use, the reel 18 is positioned relative to the lower case 16 by an outer peripheral side of the reel gear 28 being placed on this annular rib.

A pair of positioning holes 24 and 26 is formed at a front end vicinity of an outer face of the floor plate 16A of the case 12. The two positioning holes 24 and 26 are provided in the form of pockets in protrusion portions (not shown), which are provided standing from the floor plate 16A to the inside of the case 12. The positioning holes 24 and 26 are disposed to be spaced from one another along an imaginary line which intersects the loading direction. The positioning hole 24, which is at the side closer to the aperture 20, is formed in a substantially square shape, in bottom plan view, which contacts the outside of a positioning pin (not shown) of a drive device; and the positioning hole 26 is formed as a long hole with length along the aforementioned imaginary line and a width corresponding to the diameter of another positioning pin (not shown) of the drive device. Accordingly, when the recording tape cartridge 10 is loaded in a drive device and the respective positioning pins are inserted into the positioning holes 24 and 26, the recording tape cartridge 10 will be accurately positioned in horizontal directions (left-right and front-rear) in the drive device.

Portions surrounding the positioning holes 24 and 26 in the floor plate 16A are formed as reference surfaces 24A and 26A, which are finished more smoothly than other portions (which are design surfaces). When the positioning pins are inserted into the positioning holes 24 and 26, the positioning surfaces 24A and 26A abut against positioning surfaces (not shown) of the drive device, which are provided around the positioning pins. Thus, this structure is effective for positioning the recording tape cartridge 10 in a vertical direction in the drive device. Note that the positioning holes 24 and 26 are not limited to the positions shown in the drawings, and either may be provided at a rearward side. That is, the positioning holes 24 and 26 may be provided on a substantially diagonal line across the lower case 16 (or in a vicinity of such a diagonal line).

Only one of the reel 18 is rotatably accommodated inside the case 12 described above. The magnetic tape T, which serves as a recording tape, is wound on at the reel 18. The reel gear 28 is formed in an annular shape at a lower face of the reel 18. The reel gear 28 is formed to be meshable with a driving gear (not shown) which is provided at a distal end of a rotating shaft (not shown) of the drive device. A reel plate 29, which is an annular plate formed of a magnetic material, is coaxially and integrally fixed at an inner side of the reel gear 28 by insert-molding or the like.

The leader block 30 is attached to a distal end of the magnetic tape T, for drawing out the magnetic tape T. That is, a fitting recess portion (not shown), which is substantially rectangular in plan view, is formed from a left side face 30L to a rear end 30B of the leader block 30. A fitting member 32 with a substantially rectangular form (see FIGS. 7A and 7B) fits into this fitting recess portion and nips a distal end portion of the magnetic tape T. As a result, the leader block 30 is fixed at the distal end of the magnetic tape T.

The rear end 30B of the leader block 30 has a circular arc surface which, when the leader block 30 is fitted into the drive device winding reel (not shown), structures a portion of a winding surface around which the magnetic tape T is to be wound. The magnetic tape T is attached substantially at a center of the rear end 30B. A front end 30A of the leader block 30 is formed in, for example, a substantially circular arc form in plan view (but is not limited to the form illustrated), and an engaging recess portion 34 is formed in a vicinity of the front end 30A. The engaging recess portion 34 engages with a drawing-out member (not shown) which structures drawing-out means of the drive device. This engaging recess portion 34 is constituted by a curved surface, which forms a substantially semi-circular shape in plan view, and substantially flat surfaces which are continuous with the curved surface.

Fitting walls 42 and 44 are provided standing, to the same heights as the peripheral walls 14B and 16B, from an inner face of the ceiling plate 14A of the upper case 14 and an inner face of the floor plate 16A of the lower case 16, respectively, and are provided continuously with a left end edge portion of the aperture 20. A recess portion 40 is formed in the fitting walls 42 and 44, and matches an external profile of the front end 30A of the leader block 30. Further, engaging ribs 46 and 48 (only the engaging rib 48 is shown in FIGS. 5 to 7B) are standingly provided from the fitting walls 42 and 44 toward a right side peripheral wall 12B (hereafter referred to as right wall 12B). The engaging ribs 46 and 48 stand to heights that will not interfere with the magnetic tape T, and are angled by a predetermined angle β in plan view relative to the direction of loading into the drive device (and to the right wall 12B).

Further, in a vicinity of a portion at which the engaging ribs 46 and 48 connect with the right wall 12B, fitting ribs 46A and 48A (only the fitting rib 48A is shown in FIGS. 5 to 7B) are provided standing to a height that will not interfere with the magnetic tape T. The fitting ribs 46A and 48A are continuously provided integrally with the engaging ribs 46 and 48 so as to be substantially perpendicular with the engaging ribs 46 and 48. Circular arc surfaces, which match the external form of the rear end 30B of the leader block 30, are formed at side faces of the engaging ribs 46 and 48 which face the front wall 12A.

A cover member 60 is provided at the inner side of the front wall 12A. The cover member 60 covers at least the front end 30A of the leader block 30 in a state which is in contact or a state which is not in contact with the front end 30A. As shown in FIGS. 3 to 7B, this cover member 60 is structured to be slideable along the front wall 12A in the left-right direction (a width direction of the case 12), and is continuously urged in a direction for covering the front end 30A (a rightward direction in the present case) by an urging member 50, such as a torsion spring, a leaf spring, a coil spring or the like.

Thus, when the recording tape cartridge 10 is not in use, a right side face 30R of the leader block 30 faces outward, the front end 30A fits in at the recess portion 40 of the fitting walls 42 and 44. Upper and lower end portions (vertical direction outer sides relative to the fitting member 32) of the left side face 30L, which include protruding strip portions 36 and 38, respectively, abut against the engaging ribs 46 and 48. The rear end 30B fits in at the fitting ribs 46A and 48A, and the front end 30A is covered by the cover member 60. Thus, the leader block 30 is retained in the case 12.

Figure 7A:
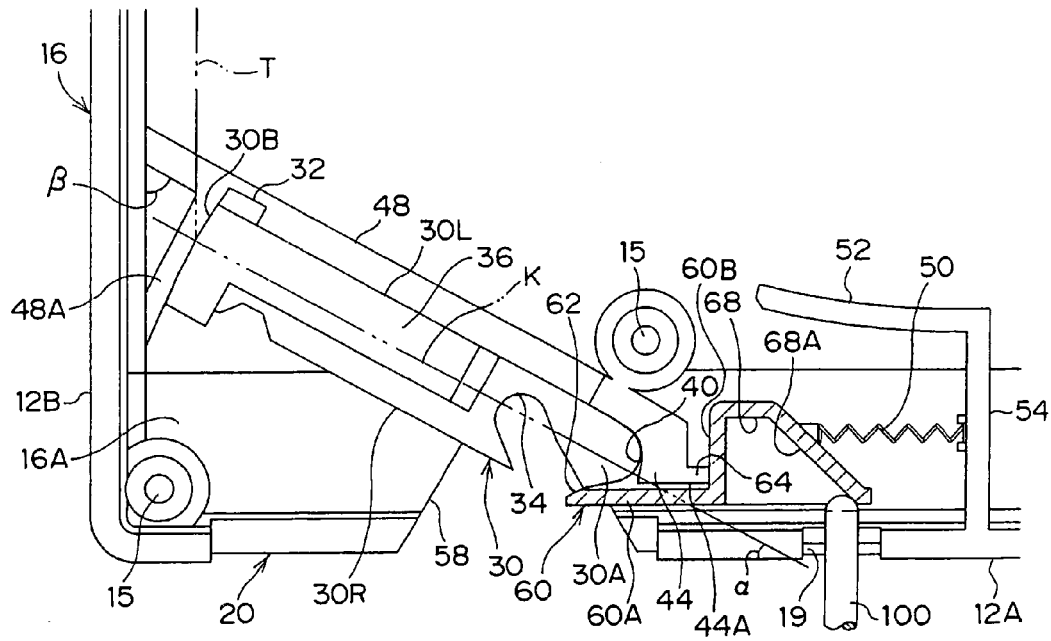
FIG. 7A is an enlarged view of principal portions of the tape cartridge of the first embodiment, in which the cover member is disposed at a leader block-restraining position.
Figure 7B:
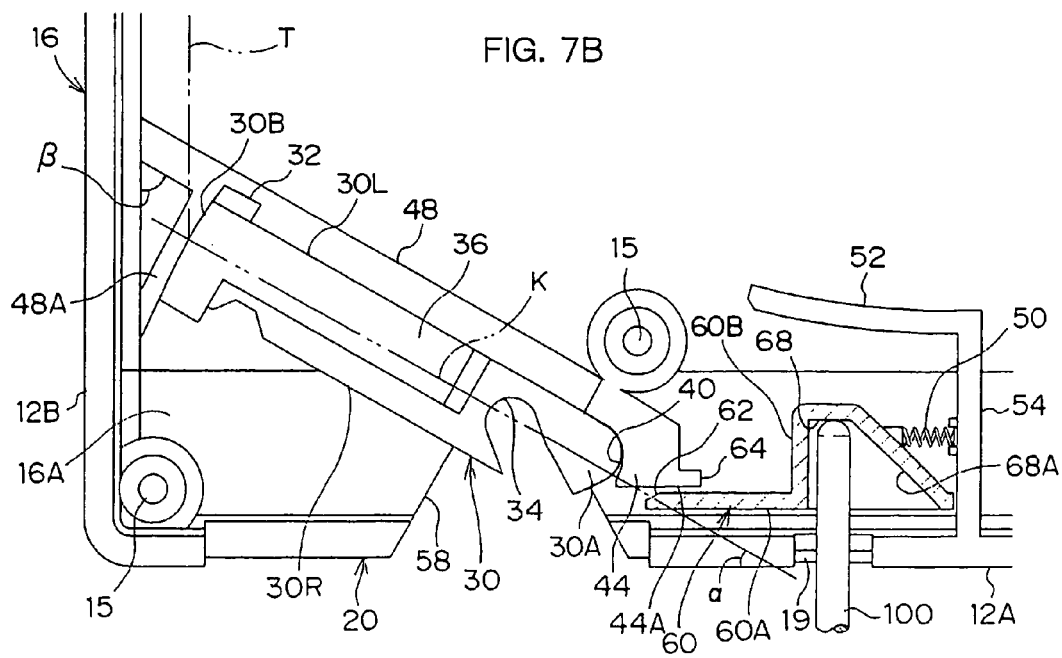
FIG. 7B is an enlarged view of principal portions of the same tape cartridge, in which the cover member is disposed at a leader block-disengaging position.

That is, as shown in FIGS. 7A and 7B, the leader block 30 is accommodated and retained at the inner side of the aperture 20 of the case 12 such that, in plan view, a center line in the length direction of the leader block 30, which is to say an imaginary line K joining a width direction center of the front end 30A (and a center of the engaging recess portion 34 that forms the substantially semi-circular shape in plan view) with a width direction center of the rear end 30B (a position at which the distal end of the magnetic tape T is inserted), is angled at a predetermined angle $\alpha$ relative to the front wall 12A ($0°<\alpha<90°$ and $\alpha=90°-\beta$). Hence, in this state, the aperture 20 is closed off by the leader block 30, and ingression of dust or the like into the case 12 is prevented.

It is preferable when the leader block 30 is thus disposed at an angle with respect to the front wall 12A, because the leader block 30 can be drawn out along a shortest distance to the drive device side winding reel and an operation of drawing out the magnetic tape T can be completed in a short time. However, the leader block 30 is not limited to such a position, and may be disposed to be parallel relative to the front wall 12A, and may be disposed so as to be perpendicular to the front wall 12A (parallel with the right wall 12B).

Cutaway portions 56 and 58, which open wider than the engaging recess portion 34 in plan view, are formed in the ceiling plate 14A of the upper case 14 and the floor plate 16A of the lower case 16, respectively, to structure upper and lower end edge portions of the aperture 20, that is, to structure the aperture 20. The cutaway portions 56 and 58 are formed at positions which correspond with the engaging recess portion 34 of the leader block 30 when the leader block 30 closes off the aperture 20. Consequently, at a time of drawing out of the leader block 30, the drive device side drawing-out member can be easily engaged with the engaging recess portion 34 through the cutaway portions 56 and 58.

Figure 3:
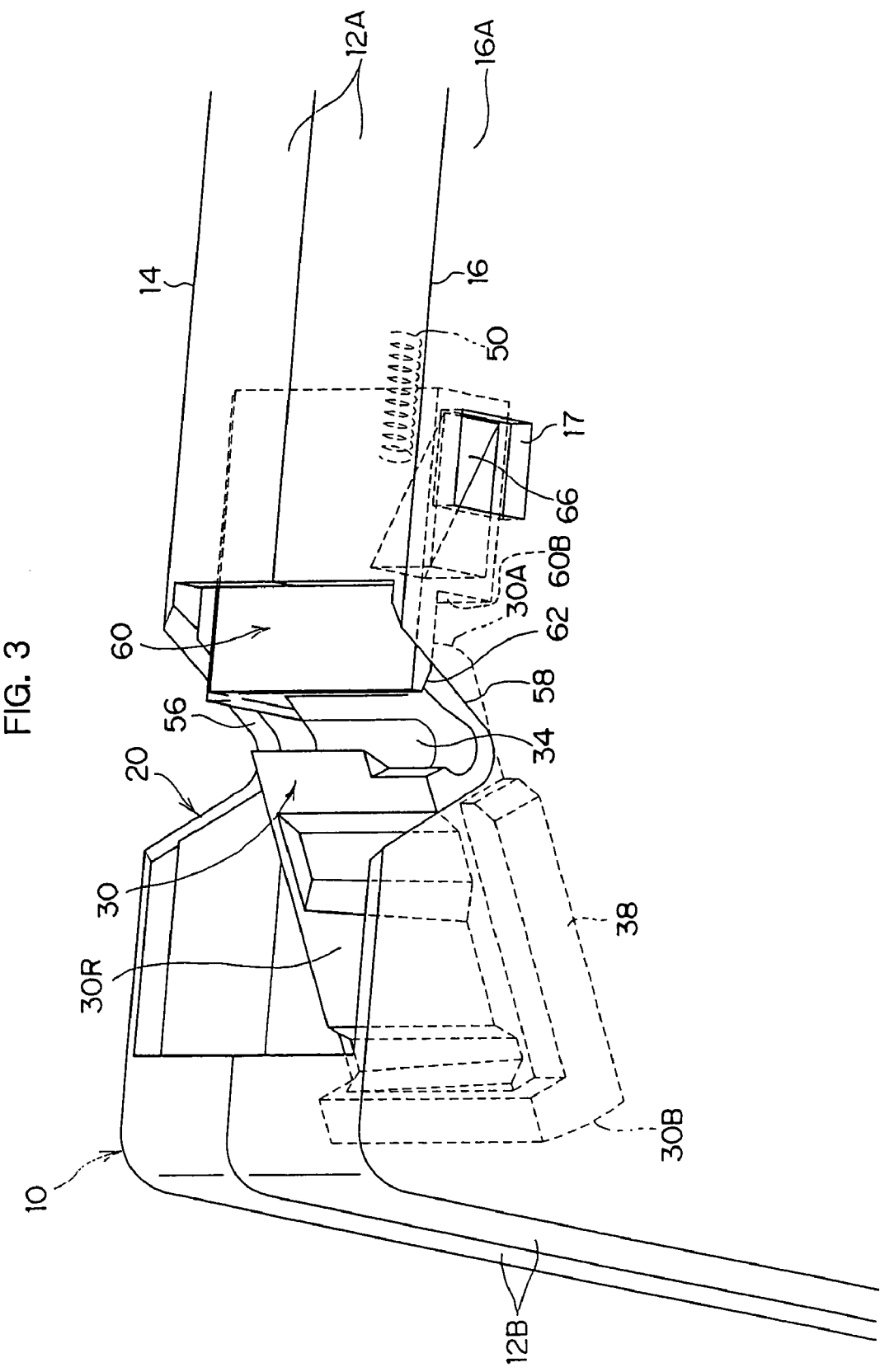
FIG. 3 is a schematic perspective view showing a state in which a leader block is covered with a cover member of a first embodiment.
Figure 4:
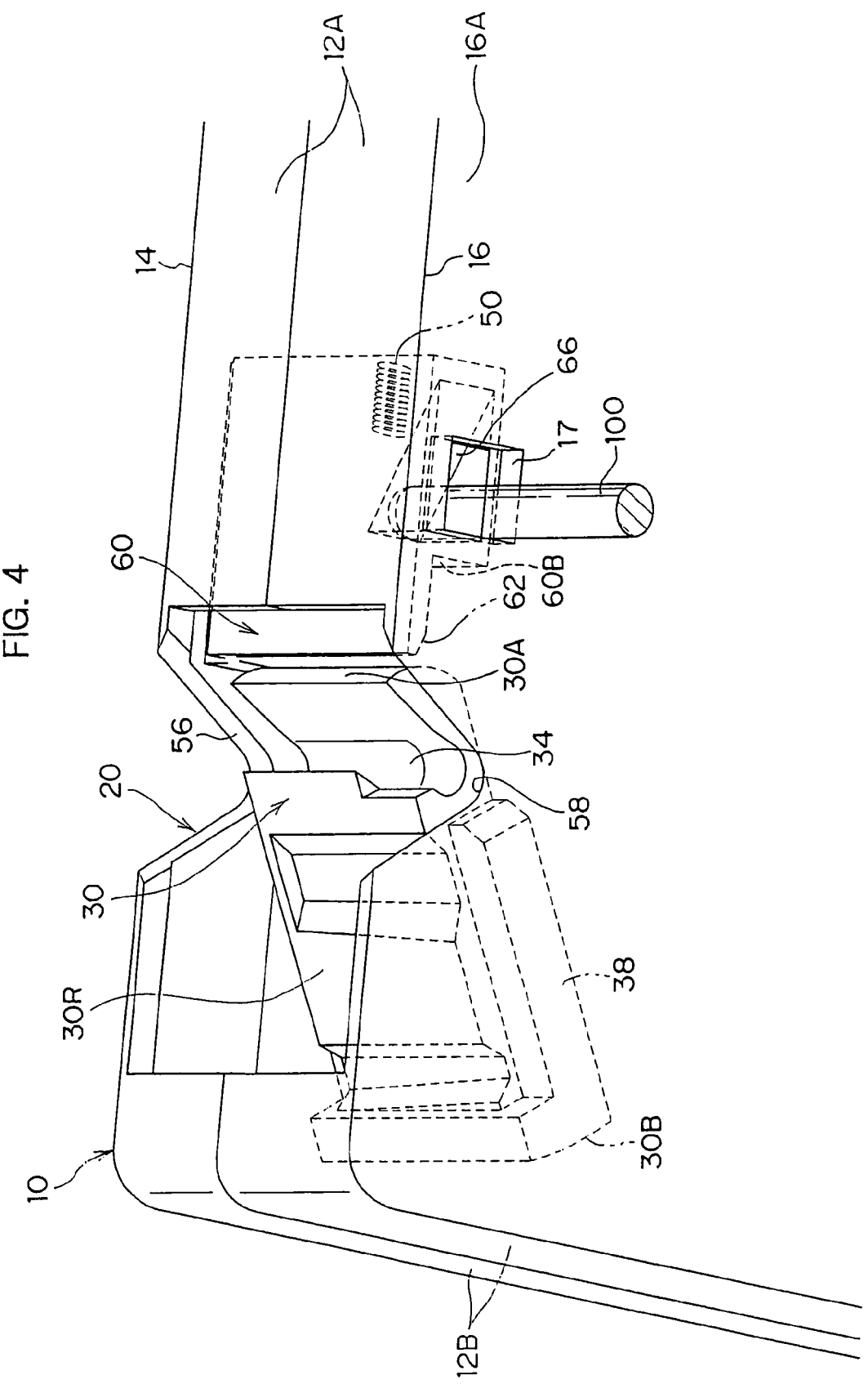
FIG. 4 is a schematic perspective view showing a state in which the cover member of the first embodiment is disengaged from the leader block by a release member which is inserted from below.
Figure 5:
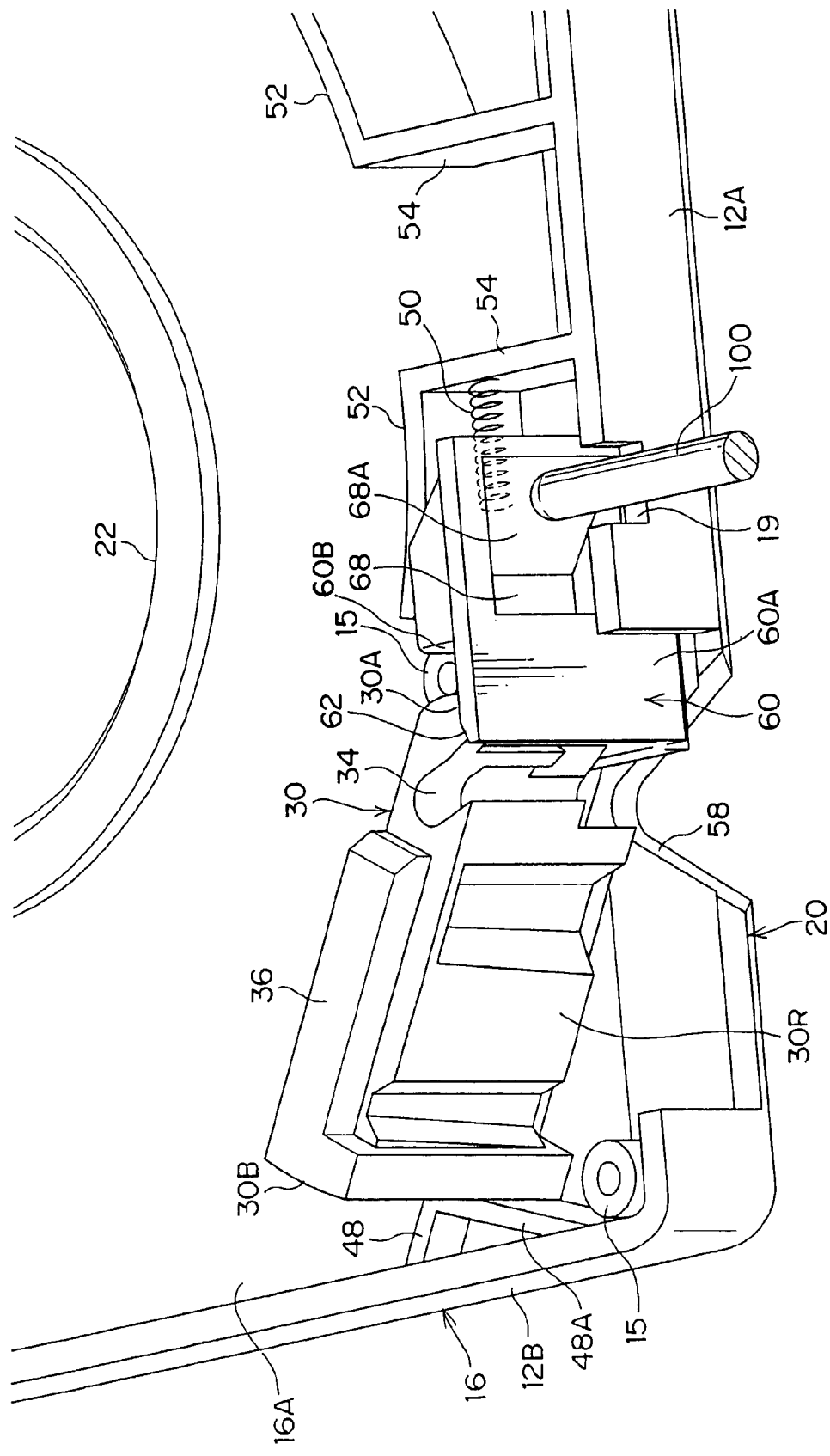
FIG. 5 is a schematic perspective view showing a state in which the leader block is covered with another cover member of the first embodiment.
Figure 6:
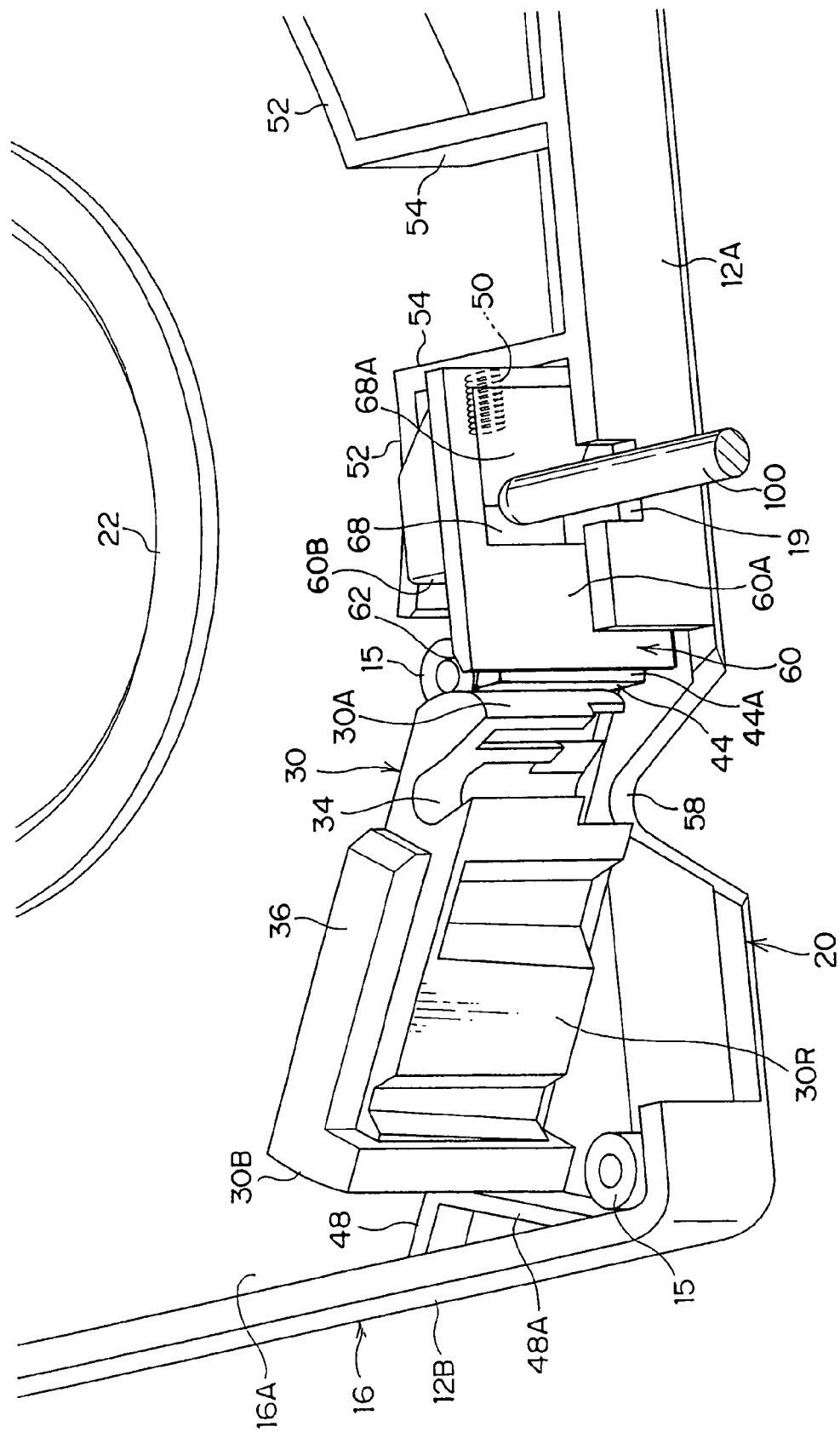
FIG. 6 is a schematic perspective view showing a state in which the other cover member of the first embodiment is disengaged from the leader block by a release member which is inserted from a front side.

Now, the cover member 60 will be described in more detail. As shown in FIGS. 3 and 4, this cover member 60 is formed in a plate form with a predetermined length and a predetermined thickness. The cover member 60 is formed such that a height thereof is slightly lower than a height of the inner side of the front wall 12A. A right side of the cover member 60 relative to a substantial center thereof has a thin plate form, and a taper surface 62 is formed at a distal end (right end) of this right side, at an inward side of the case 12. Thus, when the cover member 60 covers the leader block 30 (i.e., when the cover member 60 slides in a rightward direction), the cover member 60 will not interfere with the front end 30A.

One end of the urging member 50, which is a coil spring or the like, is attached to a side end face of a left side of the cover member 60 relative to the substantial center thereof. Another end of this urging member 50 is attached to a rib 54 (see FIGS. 5 to 7B), which is provided standing from the lower case 16 (and possibly from the upper case 14). The cover member 60 is continuously urged in the direction of covering the front end 30A, that is, in the rightward direction, by the urging member 50. Here, the rib 54 is provided continuously with a free play-restricting wall 52, which restricts play of the reel 18, and with the peripheral walls 14B and 16B. As a result, strength of the upper case 14 and the lower case 16 is improved.

Faces of the fitting walls 42 and 44 that oppose the front wall 12A serve as guide faces 42A and 44A, which guide the cover member 60. A stopper rib 64 (see FIGS. 7A and 7B), which protrudes leftward, is integrally provided protruding from left side end portions of the guide faces 42A and 44A. Accordingly, rightward sliding of the cover member 60 is restricted by a step portion 60B, at the substantial center of the cover member 60, abutting against this stopper rib 64. A cam face 66 is formed at a lower face of the left side of the cover member 60 relative to the substantial center thereof. The cam face 66 is formed as a face which is inclined downward to the left (upward to the right). An aperture 17 is formed through the floor plate 16A of the lower case 16. When the cover member 60 is disposed at a rightmost side, a left end portion of the cam face 66 opposes the aperture 17.

According to the above structure, at times of non-use of the recording tape cartridge 10, the cover member 60 is continuously urged rightward by the urging member 50, covers at least a portion of the leader block 30, for example, the front end 30A, and narrows the aperture 20. Hence, even if the case 12 is subjected to an impact due to dropping of the recording tape cartridge 10 or the like, the leader block 30 is prevented from flying out (detaching) from the case 12.

When the recording tape cartridge 10 is loaded in a drive device (at a time of use of the recording tape cartridge 10), a release member 100, which is provided at the drive device, is inserted through the aperture 17 which is formed through the floor plate 16A of the lower case 16. The release member 100 pushes against the left end portion of the cam face 66 of the cover member 60. In consequence, because the cam face 66 is a surface which is angled downward to the left (upward to the right), the release member 100 slides relatively rightward along the cam face 66. Thus, the cover member 60 slides in the leftward direction, against the urging force of the urging member 50.

As a result, the front end 30A of the leader block 30 is released (i.e., the aperture 20 is completely opened), and it is possible to take the leader block 30 out from inside the case 12. Here, a releasing force with which the release member 100 pushes the cam face 66 is around 0.5 to 5 Newtons. Means for sliding the cover member 60 is not limited to the aperture 17 which is formed through the floor plate 16A of the lower case 16 and the release member 100 which is inserted into the aperture 17. As shown in FIGS. 5 to 7B, the means for sliding the cover member 60 may be structured by an aperture 19, which is formed through the front wall 12A, and the release member 100, which is inserted into this aperture 19.

Specifically, a recess portion 68 may be formed at a predetermined position of a front face 60A of the cover member 60, which opposes the front wall 12A, and a left side in sectional plan view of the recess portion 68 may be an angled surface at a predetermined angle, which forms a cam surface 68A. Given such a structure, as shown in FIGS. 7A and 7B, when the drive device side release member 100 pushes against the cam surface 68A, the cover member 60 can be slid leftward against the urging force of the urging member 50. Naturally, the form of the cover member 60, forms of the apertures 17 and 19, a form of the release member 100 and the like are not limited to the forms in the drawings.

Next, operation of the recording tape cartridge 10 of the structure described above will be described. At times of non-use (times of storage, times of transport and the like at which the recording tape cartridge 10 is not loaded in a drive device), the aperture 20 is closed off by the leader block 30. Further, the front end 30A of the leader block 30 is covered by the cover member 60, which is urged rightward by the urging member 50. Therefore, even if the recording tape cartridge 10 is accidentally dropped, the leader block 30 will not disengage from the aperture 20.

When the recording tape cartridge 10 is to be used, the front wall 12A side thereof is oriented forward, and the recording tape cartridge 10 is loaded into a drive device along the direction of arrow A. When the recording tape cartridge 10 is loaded (inserted) into the drive device, the recording tape cartridge 10 descends to a predetermined height, or a rotation shaft (not shown) which is provided in the drive device ascends to a predetermined height. The drive device side positioning pins enter into the positioning holes 24 and 26 and restrict a horizontal direction position of the recording tape cartridge 10 (in the front-rear and left-right directions). Further, the drive device side positioning surfaces abut against the reference surfaces 24A and 26A and restrict the position of the recording tape cartridge 10 in the height direction. Thus, the recording tape cartridge 10 is positioned in the drive device with high accuracy.

Further, at this time, the drive device side release member 100 enters in through the aperture 17 (or the aperture 19) and pushes against the cam face 66 (or the cam surface 68A) of the cover member 60. In consequence, the cover member 60 slides leftward against the urging force of the urging member 50 and opens up the front end 30A of the leader block 30. Thus, the cover member 60 slides in accordance with the loading of the recording tape cartridge 10 into the drive device and, even though the cover member 60 is provided, ease of handling for users is not adversely affected.

Then, the drive device side drawing-out member (not shown) engages with the engaging recess portion 34 of the leader block 30. At this time, because the recording tape cartridge 10 is positioned with high accuracy in the drive device and the cutaway portions 56 and 58 are formed in the case 12, the drawing-out member can engage with the engaging recess portion 34 of the leader block 30 reliably and simply.

Subsequently, the leader block 30 is drawn out from inside the case 12 by the drawing-out member, which moves toward the drive device side winding reel. At this time, because the leader block 30 is disposed in the state which is angled at the predetermined angle α relative to the front wall 12A, the leader block 30 is drawn out along the shortest distance to the drive device side winding reel, and this drawing-out operation is completed in a short time.

The leader block 30 that has been drawn out from the recording tape cartridge 10 is guided to the winding reel in a state of engagement with the drawing-out member, and is accommodated in a fitting portion (not shown) which is formed in a winding surface of the winding reel. Here, the rear end 30B of the leader block 30, which is formed as a circular arc surface, structures a portion of the winding surface. Consequently, winding of the magnetic tape T around the drive device side winding reel is enabled.

Further, when the recording tape cartridge 10 descends to the predetermined height or the drive device side rotation shaft ascends to the predetermined height, a release member (not shown), which is provided at the rotation shaft, enters through a through-hole 18A, which is formed through an axial center portion of the reel 18, and releases a locking mechanism which has been blocking undesired rotation. In addition, a driving gear formed at the rotation shaft (not shown) meshes with the reel gear 28.

Hence, when the driving gear rotates for driving and causes the reel 18 to rotate synchronously with the winding reel, the magnetic tape T is wound onto the winding reel while being sequentially drawn out from inside the recording tape cartridge 10. Recording and/or replaying of data (information) is carried out by a recording/replaying head, which is provided at a predetermined tape path. Of course, a guide roller or the like (not shown) is provided at a suitable position of the drive device for guiding the magnetic tape T that is drawn out from the recording tape cartridge 10, such that the magnetic tape T that is drawn out does not interfere with a right end edge portion of the aperture 20 at this time.

Subsequently, when the recording tape cartridge 10 is to be ejected from the drive device, first the magnetic tape T is wound back to the reel 18, and the leader block 30 is returned to the case 12. That is, the rear end 30B of the leader block 30 is abuttingly fitted at the fitting ribs 46A and 48A, the upper and lower end portions of the left side face 30L abut against the engaging ribs 46 and 48, and the front end 30A is fitted in at the recess portion 40 of the fitting walls 42 and 44.

When the aperture 20 is closed off by the leader block 30 in this manner, the recording tape cartridge 10 ascends or the rotation shaft descends, and the meshing of the driving gear with the reel gear 28 is released. In addition, the release member is withdrawn from the through-hole 18A, and the reel 18 is locked by the locking mechanism so as not to rotate undesiredly.

Further, the release member 100 is withdrawn through the aperture 17 (or the aperture 19), and in accordance therewith, the cover member 60 is slid rightward by the urging force of the urging member 50. Hence, the step portion 60B at the substantial center of the cover member 60 abuts against the stopper rib 64, as a result of which the rightward sliding of the cover member 60 is restricted. In this state, the cover member 60 covers the front end 30A of the leader block 30.

Note that a portion of the leader block 30 that is covered by the cover member 60 is not limited to the front end 30A alone. For example, the engaging recess portion 34, a portion as far as approximately halfway along the leader block 30 (a substantially central vicinity of the right side face 30R), and the like may be covered. Further, the whole of the aperture 20 may be covered by the cover member 60. In other words, the cover member 60 may be structured so as to reduce size of the aperture 20 to a degree such that the leader block 30 will not fall out through the aperture 20.

At the same time, the positioning pins are withdrawn from the positioning holes 24 and 26, and the state of positioning of the recording tape cartridge 10 relative to the drive device is released. Thereafter, the recording tape cartridge 10 is moved in a direction opposite to the direction of arrow A by an unillustrated ejection mechanism, and is ejected from inside the drive device.

As has been described above, at times of non-use, at least a portion (for example, the front end 30A) of the leader block 30 is covered by the cover member 60 (i.e., the size of the aperture 20 is narrowed). Therefore, even if the recording tape cartridge 10 is dropped or the like and an impact is applied to the case 12, problems such as the leader block 30 disengaging from the aperture 20 will not occur. Therefore, users will not be subjected to worry about unwanted detachment of the leader block 30.

Further, because the cover member 60 is provided to be slideable along the front wall 12A in the left-right direction (the width direction of the case 12) at the inner side of the front wall 12A, space for disposition of the cover member 60 in the case 12 is not large, and the cover member 60 can utilize dead space inside the case 12 effectively.

Second Embodiment

Next, a second embodiment, shown in FIGS. 8 to 11B, will be described. Components that are the same as in the first embodiment are assigned the same reference numerals, and descriptions thereof will be omitted. Moreover, because the principal features of operation are the same as in the first embodiment, descriptions thereof are accordingly omitted. The form of a leader block in the second embodiment is a little different from the leader block 30 of the first embodiment. Therefore, the leader block of the second embodiment is referred to as a leader block 31, to distinguish from the leader block 30 of the first embodiment.

Figure 8:
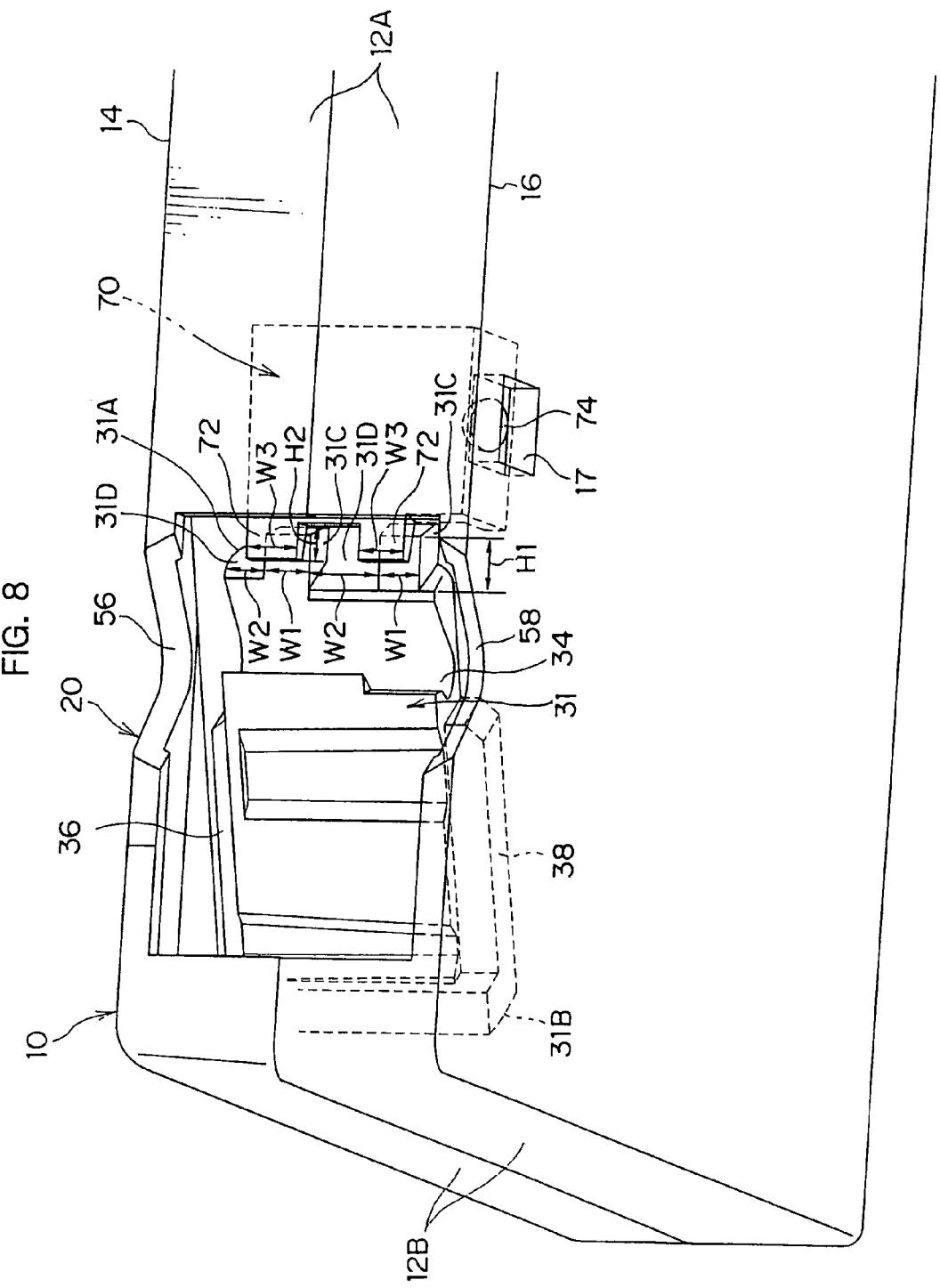
FIG. 8 is a schematic perspective view showing a state in which a leader block is covered with a cover member of a second embodiment.
Figure 9:
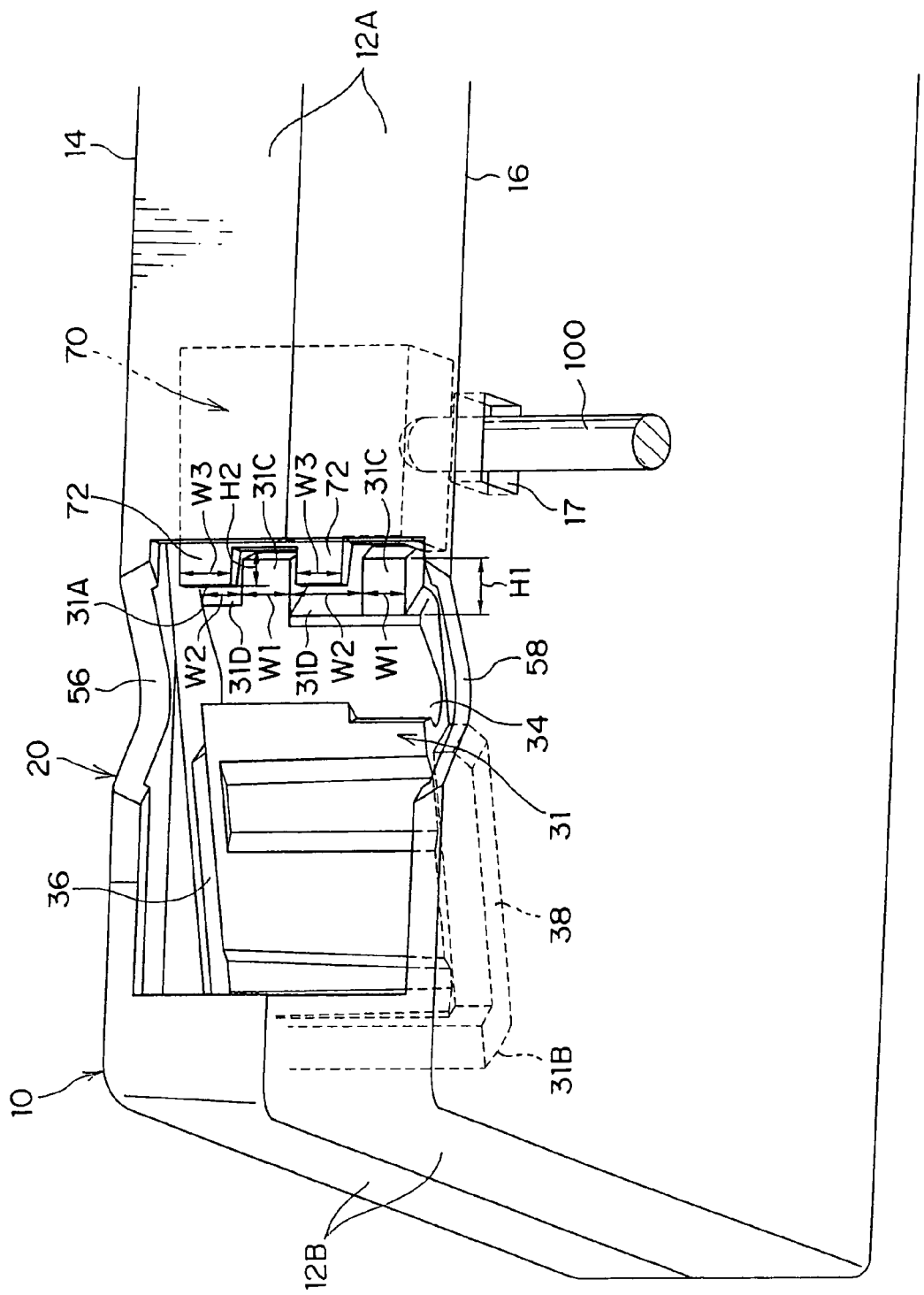
FIG. 9 is a schematic perspective view showing a state in which the cover member of the second embodiment is disengaged from the leader block by a release member which is inserted from below.

As shown in FIGS. 8 and 9, a front end 31A of the leader block 31 is formed in a comb-like shape. That is, at the front end 31A, a plurality (two in the illustrated structure) of protrusion portions 31C with a predetermined width W1 and a predetermined protrusion length H1 (and recess portions 31D with a predetermined width W2 and a predetermined depth H1) are formed at substantially equal intervals along the height direction of the front end 31A. These protrusion portions 31C will be covered by protrusion portions 72 of a cover member 70, which is described below.

The cover member 70 is formed in a plate form with a predetermined length and a predetermined thickness. The cover member 70 is formed with a height such that the cover member 70 is slideable by no more than a predetermined distance in a vertical direction along the front wall 12A (the height direction of the case 12). Further, at a right end portion of the cover member 70, at least one, and preferably the same number as the protrusion portions 31C, of the protrusion portions 72 is/are protrudingly provided, oriented to the rightward. The protrusion portions 72 have a width W3, which is slightly smaller than the width W2 of the recess portions 31D of the leader block 31, and a protrusion length H2, which is slightly less than the depth H1 of the recess portions 31D. The protrusion portions 72 are provided at positions such that, when the cover member 70 is at a lowest position thereof, the protrusion portions 72 can cover the protrusion portions 31C, in a contacting state or in a non-contacting state.

Figure 11A:
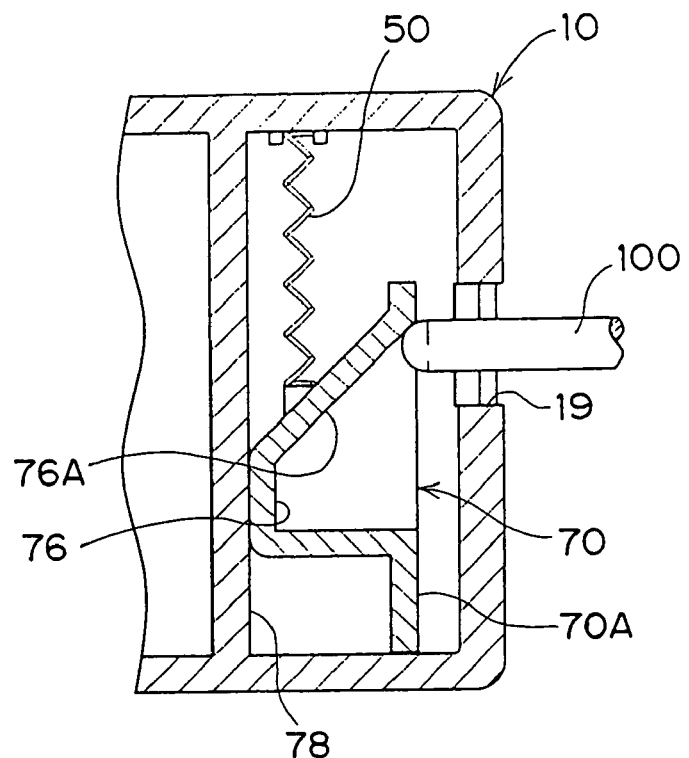
FIGS. 11A and 11B are views for explaining operation of the other cover member of the second embodiment.
Figure 11B:
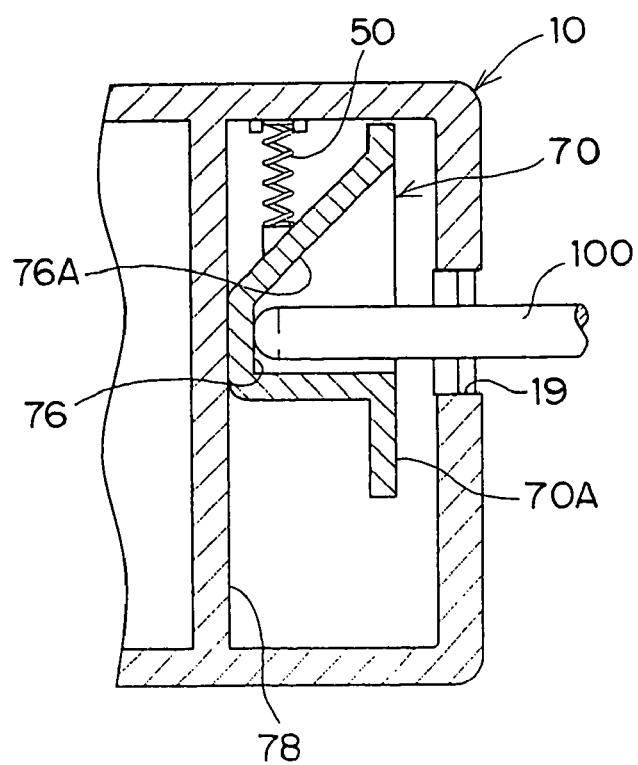
Figure 12:
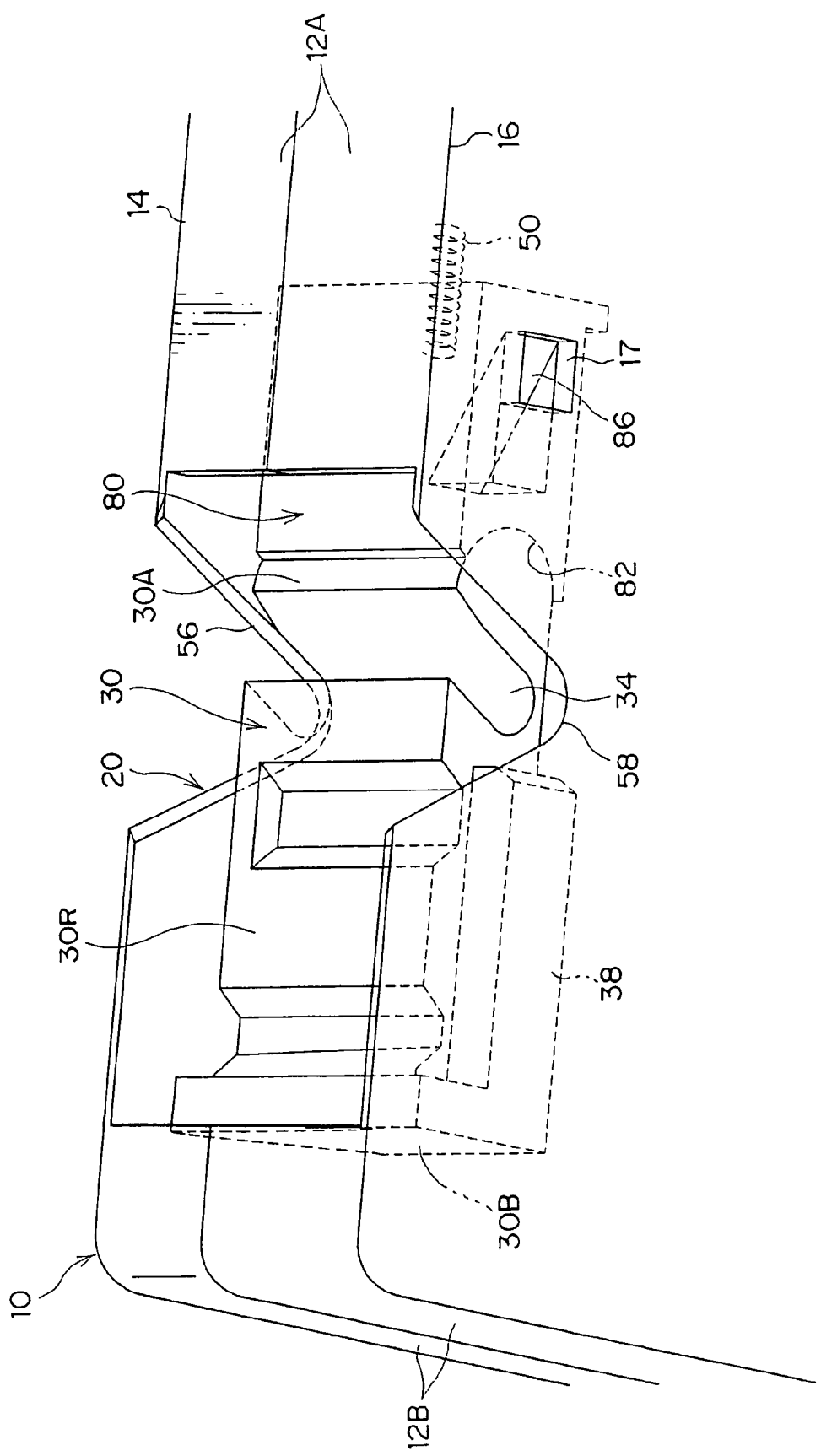
FIG. 12 is a schematic perspective view showing a state in which an abutting member of a third embodiment abuts against a leader block.
Figure 13:
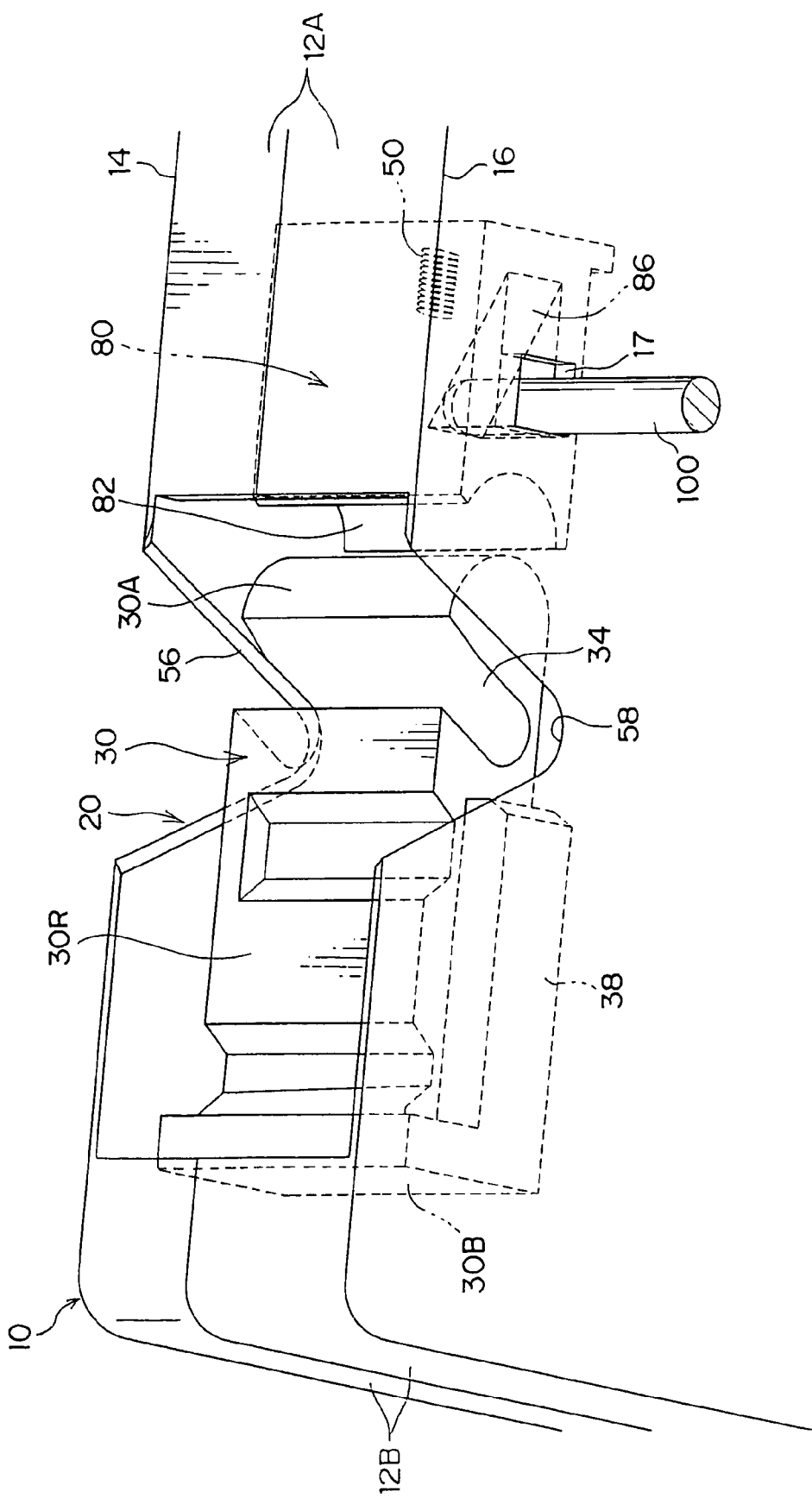
FIG. 13 is a schematic perspective view showing a state in which the abutting member of the third embodiment is separated from the leader block by a release member which is inserted from below.

One end of the urging member 50, such as a torsion spring, a leaf spring, a coil spring or the like, is attached to an upper face of the cover member 70 (see FIGS. 11A and 11B). The other end of the urging member 50 is attached to the inner face of the ceiling plate 14A of the upper case 14. As a result, the cover member 70 is continuously urged downward, and a lower face of the cover member 70 is continuously abutted against the inner face of the floor plate 16A of the lower case 16.

An abutting portion 74, against which the drive device side release member 100 abuts, is formed substantially at the center of the lower face of the cover member 70. Further, the aperture 17 is formed through the floor plate 16A of the lower case 16, and the abutting portion 74 opposes the aperture 17. It is preferable if a guide rib 78 (see FIGS. 11A and 11B) is provided standing from the ceiling plate 14A of the upper case 14 and the floor plate 16A of the lower case 16, to enable sliding of the cover member 70 in the vertical direction (the height direction of the case 12). However, structures for guiding by the free play-restricting wall 52, the rib 54 or the like are also possible.

With the structure described above, when the recording tape cartridge 10 is not in use, the cover member 70 is continuously urged downward by the urging member 50, and the protrusion portions 31C of the leader block 31 are covered by the protrusion portions 72. Therefore, even if an impact is applied to the case 12 by dropping of the recording tape cartridge 10 or the like, the leader block 31 is prevented from flying out (detaching) from the case 12.

Further, when the recording tape cartridge 10 is loaded at a drive device (at a time of use of the recording tape cartridge 10), the release member 100 provided in the drive device is inserted through the aperture 17 formed through the floor plate 16A of the lower case 16 and pushes against the abutting portion 74 of the cover member 70. In consequence, the cover member 70 is pushed upward, against the urging force of the urging member 50 and while being supported by the guide rib 78 or the like, until the protrusion portions 72 are at the same heights as the recess portions 31D of the leader block 31 (i.e., until the protrusion portions 72 are at heights so as not to cover the protrusion portions 31C). Hence, it is possible to take the leader block 31 out through the aperture 20.

Figure 10:
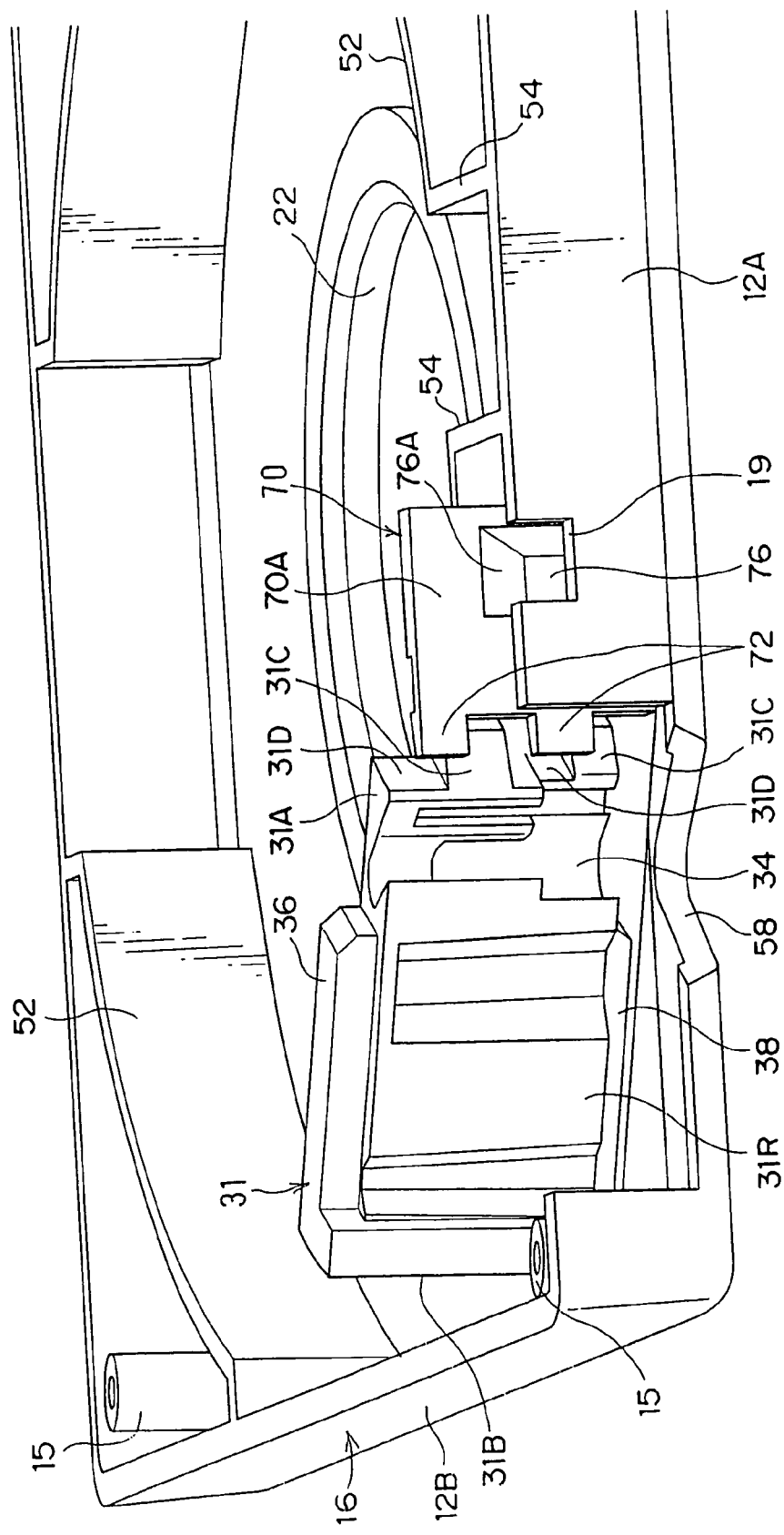
FIG. 10 is a schematic perspective view showing a state in which the leader block is covered with another cover member of the second embodiment.

Here, a releasing force with which the release member 100 pushes against the abutting portion 74 is around 0.5 to 5 Newtons. Means for sliding the cover member 70 is not limited to the aperture 17 which is formed through the floor plate 16A of the lower case 16 and the release member 100 which is inserted into the aperture 17. As shown in FIGS. 10, 11A and 11B, the means for sliding the cover member 70 may be structured by the aperture 19, which is formed through the front wall 12A, and the release member 100, which is inserted into this aperture 19.

Specifically, a recess portion 76 may be formed at a predetermined position of a front face 70A of the cover member 70, which opposes the front wall 12A, and an upper side in side sectional view of the recess portion 76 may be an angled surface at a predetermined angle, which forms a cam surface 76A. Given such a structure, as shown in FIGS. 11A and 11B, when the drive device side release member 100 pushes against the cam surface 76A, the cover member 70 can be slid upward against the urging force of the urging member 50.

Anyhow, in conclusion, the protrusion portions 31C of the leader block 31 are covered by the protrusion portions 72 of the cover member 70 at times of non-use. Therefore, even if the recording tape cartridge 10 is dropped or the like and an impact is applied to the case 12, problems such as the leader block 31 disengaging from the aperture 20 will not occur. Therefore, users will not be subjected to worry about unwanted detachment of the leader block 31.

Further, because the cover member 70 is provided to be slideable along the front wall 12A in the vertical direction (the height direction of the case 12) at the inner side of the front wall 12A, space for disposition of the cover member 70 in the case 12 is not large, and the cover member 70 can utilize dead space inside the case 12 effectively.

Moreover, the distance by which the cover member 70 slides does not exceed the height of the leader block 30, because the leader block 30 is formed with the comb-like shape. Therefore, a problem such as the height of the case 12 increasing does not arise. Note that, similarly to the first embodiment, the form of the cover member 70, the forms of the apertures 17 and 19, the form of the release member 100 and the like are not limited to the forms in the drawings.

Third Embodiment

Next, a third embodiment, shown in FIGS. 12 to 15B, will be described. Components that are the same as in the first embodiment are assigned the same reference numerals, and descriptions thereof will be omitted. Moreover, because the principal features of operation are the same as in the first embodiment, descriptions thereof are accordingly omitted. In this third embodiment, the leader block 30 is disposed to be parallel with the front wall 12A. That is, the engaging ribs 46 and 48 are provided so as to be parallel with the front wall 12A, and the fitting ribs 46A and 48A are provided so as to be perpendicular to the front wall 12A (so as to be parallel with the right wall 12B). Further, instead of the cover members 60 and 70 described above, an abutting member 80 is provided. The abutting member 80 abuts against the front end 30A of the leader block 30 with a predetermined pushing force. In cooperation with the fitting ribs 46A and 48A, the abutting member 80 constrains the leader block 30.

The abutting member 80 is formed in a plate form with a predetermined length and a predetermined thickness, and with a height slightly less than the height of the inner side of the front wall 12A. A recess portion 82, which abuts against the front end 30A of the leader block 30, is formed at a right side end face of the abutting member 80. It is preferable if the shape of this recess portion 82 is formed in a shape that matches up with the shape of the front end 30A. In the present case, the recess portion 82 is formed with a circular arc form in plan view.

One end of the urging member 50 such as a torsion spring, a leaf spring, a coil spring or the like is attached to a left side end face of the abutting member 80. The other end of the urging member 50 is attached to the rib 54 (see FIGS. 14, 15A and 15B) which is provided standing from the lower case 16 (and possibly at the upper case 14). As a result, the abutting member 80 is continuously urged to abut against the front end 30A by the urging member 50; that is, the abutting member 80 is urged rightward.

A guide rib 90 (see FIGS. 14, 15A and 15B) is provided standing from the ceiling plate 14A of the upper case 14 and the floor plate 16A of the lower case 16. This guide rib 90 supports the abutting member 80 to be slideable in the left-right direction (the width direction of the case 12). An engaging step portion 92 is formed at a predetermined position of the guide rib 90. A stopper rib 84, which is provided protruding from a left end portion of the abutting member 80 toward the interior of the case 12 (i.e., rearward) engages at the engaging step portion 92. Accordingly, sliding of the abutting member 80 to the rightward is restricted by the stopper rib 84 engaging with the engaging step portion 92.

Obviously, the abutting member 80 is structured such that, when the abutting member 80 is at the position of restriction by the stopper rib 84, the recess portion 82 abuts against the front end 30A with a predetermined pushing force. Meanwhile, a cam face 86 is formed at a lower face of the abutting member 80. The cam face 86 is formed as a face which is inclined downward to the left (upward to the right). The aperture 17 is formed through the floor plate 16A of the lower case 16. When the abutting member 80 is disposed at a rightmost side, a left end portion of the cam face 86 opposes the aperture 17.

With the structure described above, when the recording tape cartridge 10 is not in use, the abutting member 80 is continuously urged rightward by the urging member 50, and the recess portion 82 of the abutting member 80 abuts against the front end 30A of the leader block 30 with the predetermined pushing force. Thus, the rear end 30B of the leader block 30 abuts against the fitting ribs 46A and 48A, and the front end 30A is in a state of being pushed rightward by the abutting member 80, which is to say a state in which the leader block 30 is gripped by the fitting ribs 46A and 48A and the abutting member 80. Therefore, even if an impact is applied to the case 12 by dropping of the recording tape cartridge 10 or the like, the leader block 30 is prevented from flying out (detaching) from the case 12.

Further, when the recording tape cartridge 10 is loaded in a drive device (at a time of use of the recording tape cartridge 10), the release member 100 provided in the drive device is inserted through the aperture 17 formed through the floor plate 16A of the lower case 16 and pushes against the left end portion of the cam face 86 of the abutting member 80. In consequence, because the cam face 86 is a surface which is angled downward to the left (upward to the right), the release member 100 slides relatively rightward along the cam face 86. That is, the abutting member 80 slides leftward against the urging force of the urging member 50.

Figure 14:
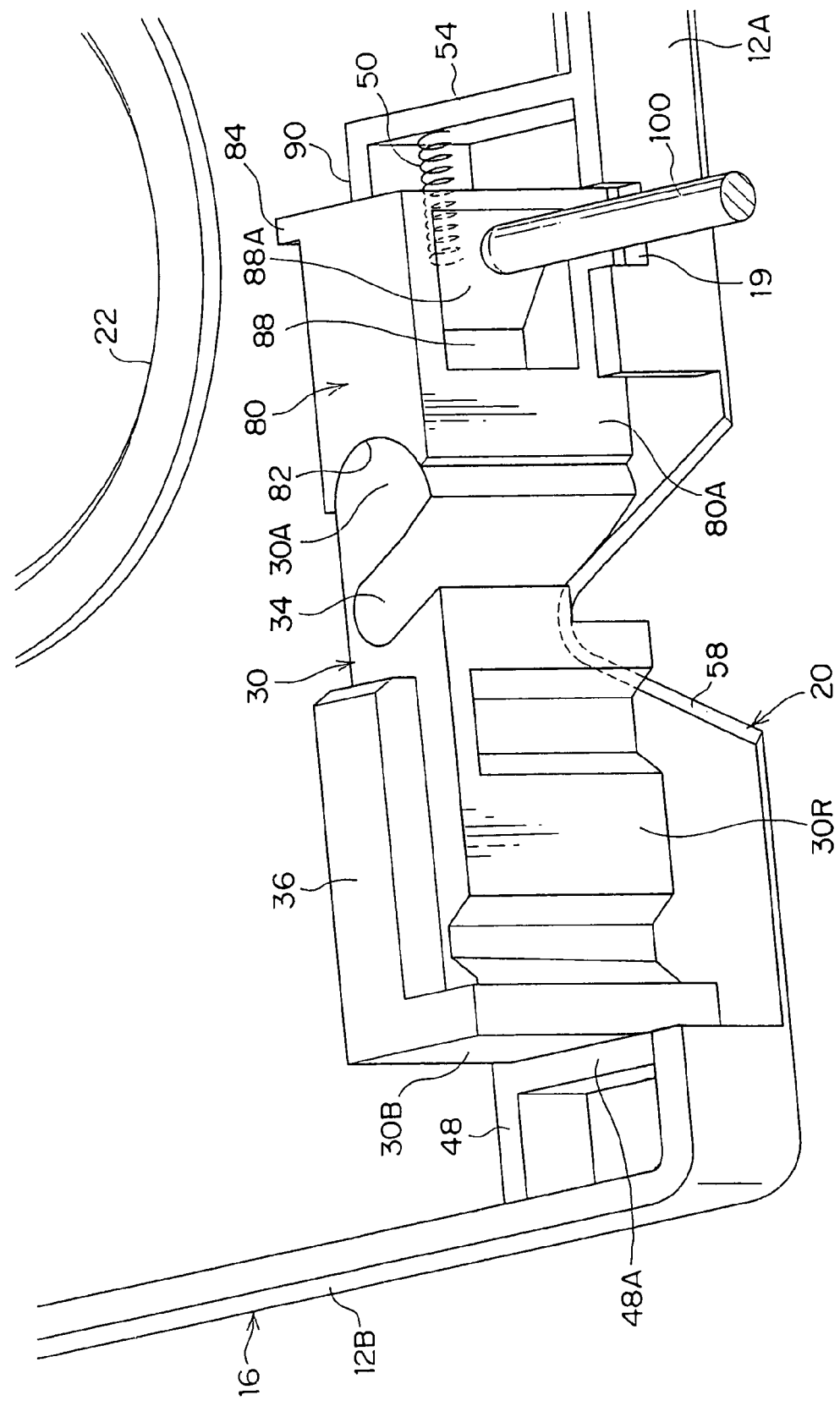
FIG. 14 is a schematic perspective view showing a state in which another abutting member of the third embodiment abuts against the leader block.

As a result, the recess portion 82 of the abutting member 80 is separated from the front end 30A of the leader block 30 (i.e., the leader block 30 is freed up), and it is possible to take the leader block 30 out from inside the case 12. Here, a releasing force with which the release member 100 pushes the cam face 86 is around 0.5 to 5 Newtons. Means for sliding the abutting member 80 is not limited to the aperture 17 which is formed through the 16A of the lower case 16 and the release member 100 which is inserted into the aperture 17. As shown in FIGS. 14, 15A and 15B, the means for sliding the abutting member 80 may be structured by the aperture 19, which is formed through the front wall 12A, and the release member 100, which is inserted into this aperture 19.

Specifically, a recess portion 88 may be formed at a predetermined position of a front face 80A of the abutting member 80, which opposes the front wall 12A, and a left side in sectional plan view of the recess portion 88 may be an angled surface at a predetermined angle, which forms a cam surface 88A. Given such a structure, as shown in FIGS. 15A and 15B, when the drive device side release member 100 pushes against the cam surface 88A, the abutting member 80 can be slid leftward against the urging force of the urging member 50.

Anyhow, in conclusion, the front end 30A of the leader block 30 is pushed rightward and constrained by the abutting member 80 at times of non-use. Therefore, even if the recording tape cartridge 10 is dropped or the like and an impact is applied to the case 12, problems such as the leader block 30 disengaging from the aperture 20 will not occur. Therefore, users will not be subjected to worry about unwanted detachment of the leader block 30.

Further, because the abutting member 80 is provided to be slideable along the front wall 12A in the left-right direction (the width direction of the case 12) at the inner side of the front wall 12A, space for disposition of the abutting member 80 in the case 12 is not large, and the abutting member 80 can utilize dead space inside the case 12 effectively. Note that, similarly to the first and second embodiments, the form of the abutting member 80, the forms of the apertures 17 and 19, the form of the release member 100 and the like are not limited to the forms in the drawings.

First to third embodiments relating to the present invention are as described above, but now positional relationships between the leader block 30 and a door will be described for cases in which, rather than the aperture 20 being closed off by the leader block 30, the leader block 30 is disposed inside the case 12 and the aperture 20 is closed off by the door. Table 1 shows levels of (un)satisfactoriness according to positions of the leader block 30 and positions of the door. A front wall in table 1 is the front wall 12A, being a loading side peripheral wall which intersects the direction of loading into a drive device. A right wall in table 1 is the right wall 12B, being a peripheral wall which is parallel to the direction of loading into the drive device. Hence, "both walls" means the front wall and the right wall.

TABLE 1

|  |  | Door | | |
|---|---|---|---|---|
|  |  | Parallel to right wall | Inclined relative to both walls | Parallel to front wall |
| Leader block | Parallel to right wall | C1 | B | A |
|  | Inclined relative to both walls | C1 | B | A |
|  | Parallel to front wall | C1 | C2 | C2 |

In table 1, 'C1' and 'C2' indicate cases which are not preferable for design, 'B' indicates cases which are preferable for design, and 'A' indicates cases which are most preferable for design. Specifically, in a case in which the aperture 20 is formed at a predetermined position of the right wall 12B and the door opens and closes the aperture 20 by sliding parallel to the right wall 12B at the inner side of the right wall 12B, whatever attitude the leader block 30 is disposed in, a tape path of the magnetic tape T in a drive device will be longer, which is not preferable for design. This case is indicated by 'C1'.

Further, in a case in which the leader block 30 is disposed parallel to the front wall 12A, if the aperture 20 is not formed in the right wall 12B, that is, if the door is not a structure which opens and closes the aperture 20 by sliding parallel to the right wall 12B at the inner side of the right wall 12B, the effectiveness with which the aperture 20 is covered will be poor, which is of no value for design. This case is indicated by 'C2'.

Figure 16A:
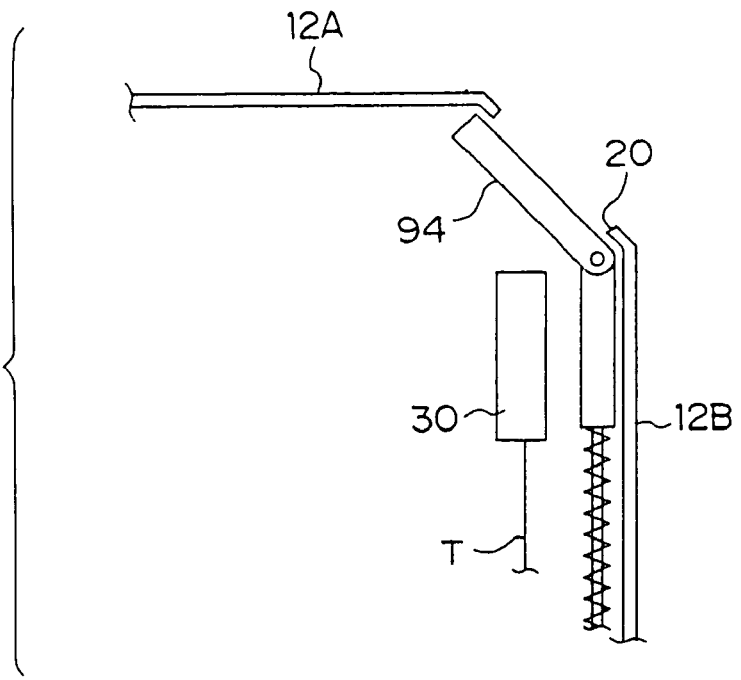
FIGS. 16A and 16B are schematic plan views showing a relationship between a leader block and a door.
Figure 16B:
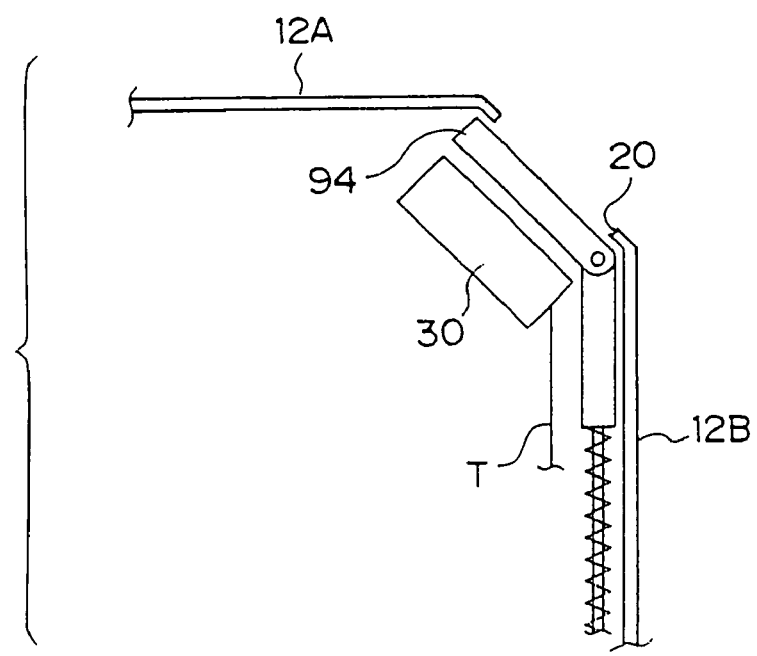

In contrast, there is a case in which, as shown in FIGS. 16A and 16B, the case 12 is formed such that a corner portion at the side of loading into a drive device is cut to an angle in plan view, the aperture 20 is formed in the corner portion which is cut away to this angle, and a door 94 is provided so as to open and close this aperture 20. In this case, it is preferable for the leader block 30 to be disposed parallel to the right wall 12B or, similarly to the first and second embodiments described above, to be disposed at an angle relative to both walls (the front wall 12A and the right wall 12B). When the leader block 30 is disposed thus, structure of the door 94 will be a little more complicated, but there will be an advantage in that the tape path of the magnetic tape T is not lengthened. This case is indicated by 'B'.

Figure 17A:
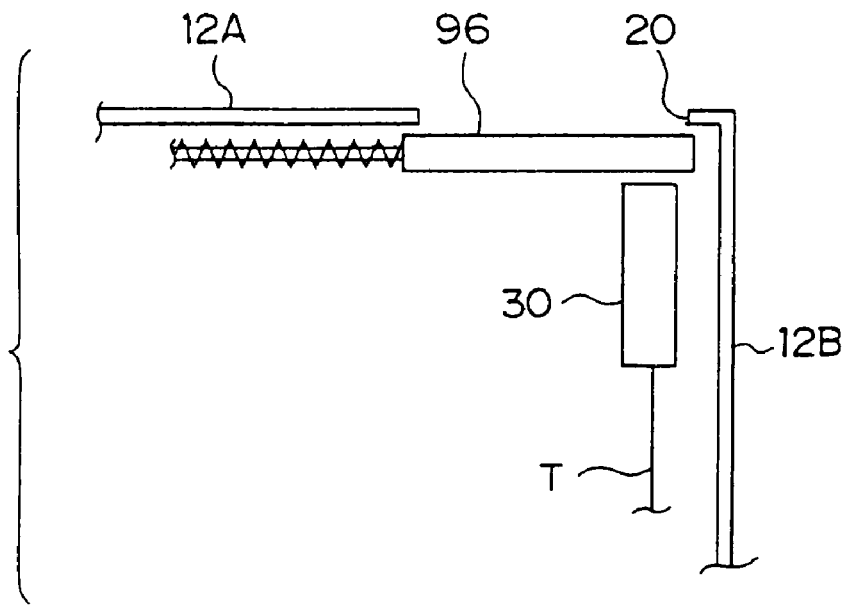
FIGS. 17A and 17B are schematic plan views showing a relationship between another leader block and another door.
Figure 17B:
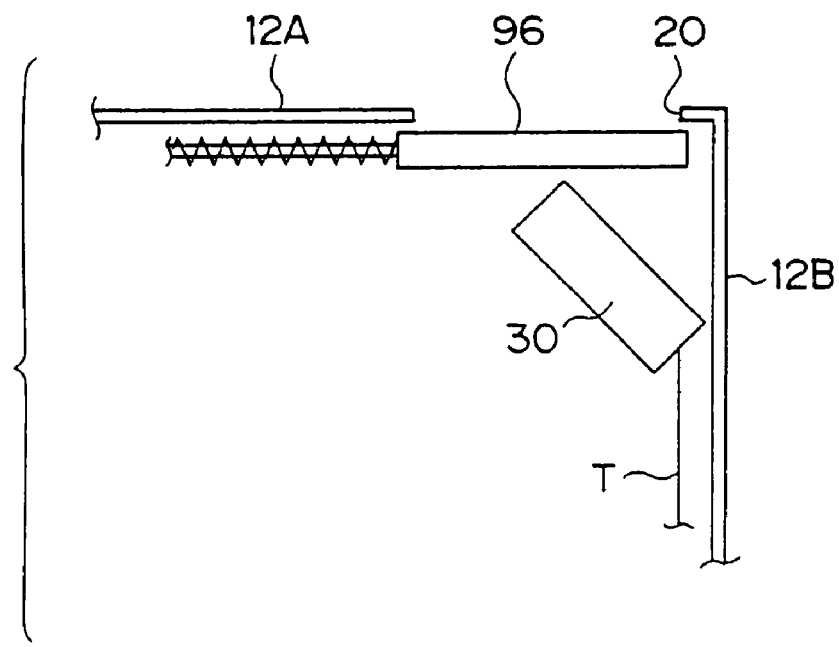
Figure 18A:
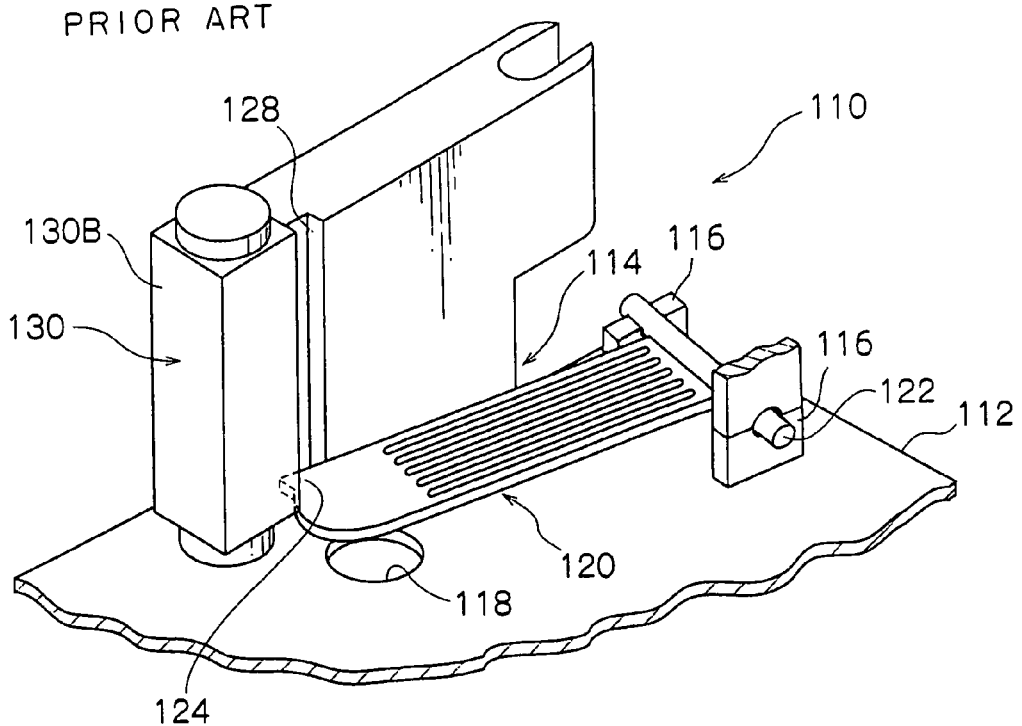
FIGS. 18A and 18B are schematic perspective views showing conventional means for preventing detachment of a leader block.
Figure 18B:
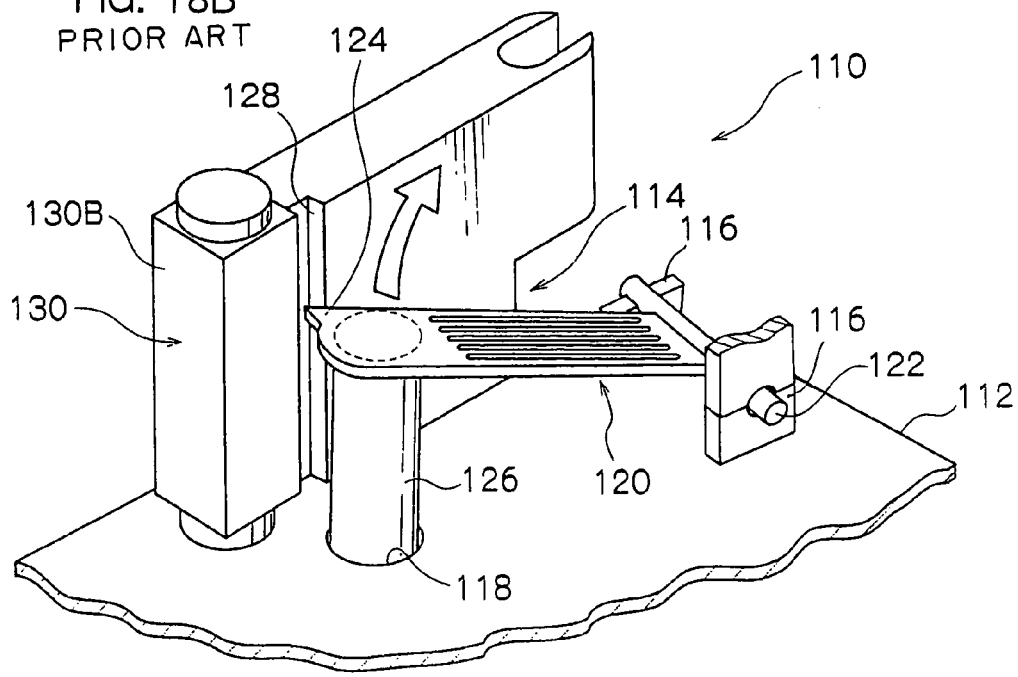
Figure 19A:
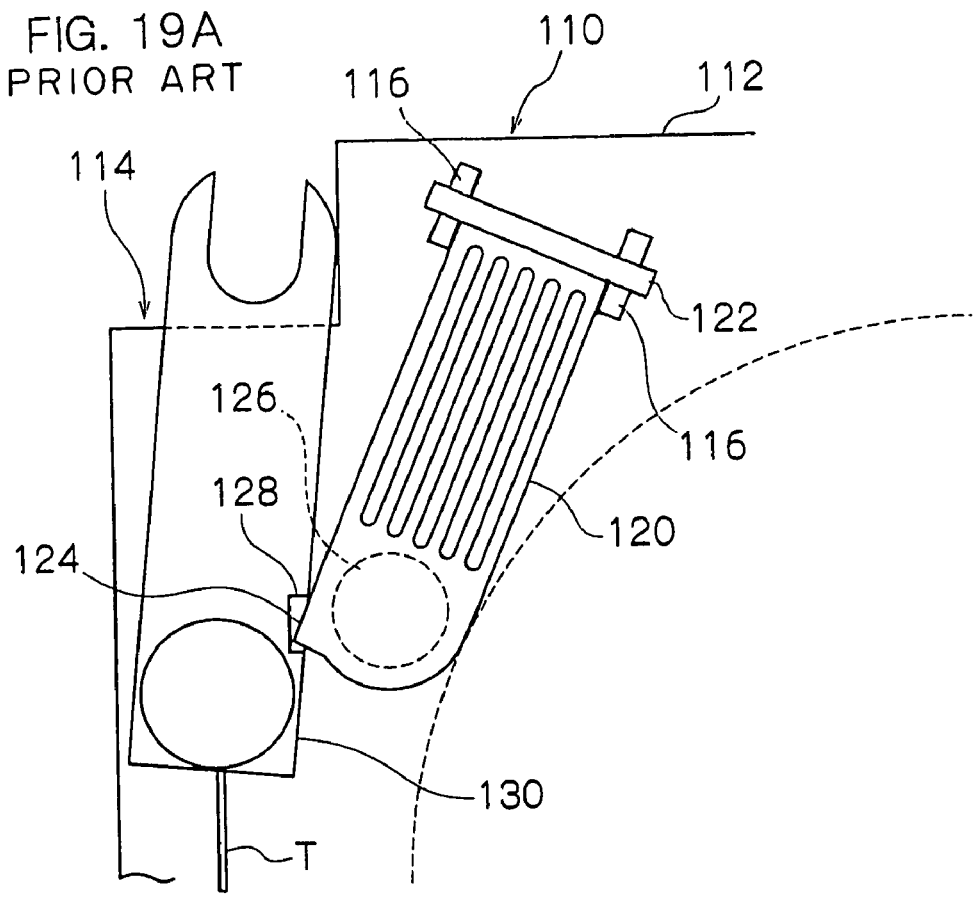
FIGS. 19A and 19B are schematic explanatory views showing the conventional means for preventing detachment of a leader block.
Figure 19B:
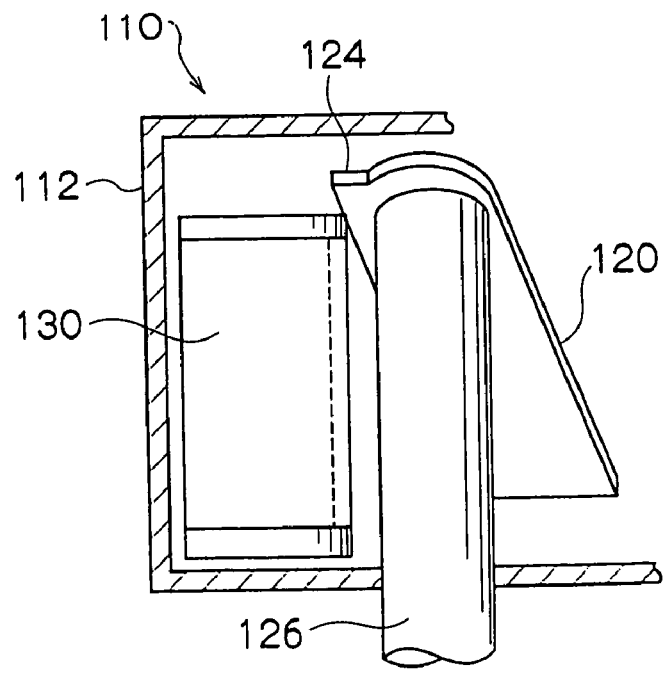

Further, in a case in which, as shown in FIGS. 17A and 17B, the aperture 20 is formed at a predetermined position of the front wall 12A and a door 96 opens and closes the aperture 20 by sliding parallel with the front wall 12A at the inner side of the front wall 12A, it is preferable for the leader block 30 to be disposed parallel to the right wall 12B or, similarly to the first and second embodiments, to be disposed at an angle relative to both walls (the front wall 12A and the right wall 12B). When the leader block 30 is disposed thus, structure of the door 96 can be simple, and the aperture 20 can be effectively opened and closed without lengthening the tape path of the magnetic tape T. This case is indicated by 'A', and is the most desirable positional relationship.

Anyhow, in conclusion, when the door 94 or 96 is provided thus, even if, for example, the recording tape cartridge 10 is accidentally dropped, problems such as the leader block 30 flying out (detaching) from the case 12 will not occur. That is, flying out (detachment) of the leader block 30 from the case 12 can be more effectively prevented. Moreover, because the aperture 20 can be closed up, dust-proofing of the recording tape cartridge 10 can be further improved, regardless of the size of the aperture 20.

What is claimed is:

1. A tape cartridge which is insertable at a tape drive, the tape drive including an opening member which is operably engageable with the tape cartridge at a time of insertion of the tape cartridge and carrying out at least one of reading and writing of data, the tape cartridge comprising:
a case which accommodates a tape;
a tape access opening formed in the case;
a leader block attached to an end of the tape;
an accommodation portion for accommodating the leader block; and
an engaging member which is slideable between a restraining position, at which the engaging member engages with the leader block for restraining the leader block at the accommodation portion, and a non-restraining position, at which the engaging member does not engage with the leader block.

2. The tape cartridge of claim 1, wherein the engaging member slides along an inner face of the case.

3. The tape cartridge of claim 1, wherein the engaging member slides in a vertical direction at the time of insertion of the tape cartridge.

4. The tape cartridge of claim 1, wherein the engaging member slides in a horizontal direction at the time of insertion of the tape cartridge.

5. The tape cartridge of claim 1, wherein the engaging member is moved to the non-restraining position by the opening member of the tape drive in conjunction with an operation of the insertion of the tape cartridge.

6. The tape cartridge of claim 5, wherein the engaging member comprises a cam surface.

7. The tape cartridge of claim 6, wherein the opening member is pushed against the cam surface of the engaging member by the operation of insertion of the tape cartridge, and force of this pushing is converted, by a wedge effect, to a force in a sliding direction for moving the engaging member to the non-restraining position.

8. The tape cartridge of claim 1, further comprising an urging member which continuously urges the engaging member to the restraining position.

9. The tape cartridge of claim 1, wherein the case comprises a peripheral wall, and the tape access opening is formed in the peripheral wall of the case.

10. The tape cartridge of claim 1, wherein the tape access opening is closed by the leader block that is disposed at the accommodation portion.

11. The tape cartridge of claim 1, wherein the accommodation portion is provided in the case in a vicinity of the tape access opening.

12. The tape cartridge of claim 1, further comprising a reel around which the tape is wound, the reel being rotatably accommodated in the case.

13. A tape drive for carrying out at least one of reading and writing of data at a tape cartridge which is insertable at the tape drive, wherein the tape cartridge includes:
- a case which accommodates a tape;
- a tape access opening formed in the case;
- a leader block attached to an end of the tape;
- an accommodation portion for accommodating the leader block; and
- an engaging member which is slideable between a restraining position, at which the engaging member engages with the leader block for restraining the leader block at the accommodation portion, and a non-restraining position, at which the engaging member does not engage with the leader block, and wherein the tape drive includes an opening member which is capable of operably engaging with the tape cartridge at a time of insertion of the tape cartridge.

14. The tape drive of claim 13, wherein the opening member moves the engaging member to the non-restraining position in conjunction with an operation of the insertion of the tape cartridge.

15. The tape drive of claim 14, wherein the engaging member comprises a cam surface, and
the opening member is pushed against the cam surface by the operation of insertion of the tape cartridge, and force of this pushing is converted, by a wedge effect, to a force in a sliding direction for moving the engaging member to the non-restraining position.

* * * * *